United States Patent
Yokoi et al.

(10) Patent No.: US 8,564,837 B2
(45) Date of Patent: Oct. 22, 2013

(54) IMAGE PROCESSING APPARATUS, METHOD, AND PROGRAM PRODUCT FOR GENERATING A COLOR IMAGE VISIBLE UNDER ORDINARY LIGHT WITH A LATENT IMAGE REGION EASILY DISCRIMINATED UNDER INFRARED LIGHT

(75) Inventors: Masanori Yokoi, Yokohama (JP); Junichi Hayashi, Kamakura (JP); Koji Harada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 13/284,719

(22) Filed: Oct. 28, 2011

(65) Prior Publication Data
US 2012/0127493 A1 May 24, 2012

(30) Foreign Application Priority Data
Nov. 19, 2010 (JP) ................................. 2010-259521

(51) Int. Cl.
*H04N 1/56* (2006.01)
*H04N 1/58* (2006.01)
*H04N 1/60* (2006.01)
*H04N 1/00* (2006.01)

(52) U.S. Cl.
CPC ........... *H04N 1/0087* (2013.01); *H04N 1/6033* (2013.01); *H04N 1/605* (2013.01); *H04N 1/6072* (2013.01)
USPC ......... 358/2.1; 358/3.27; 358/3.28; 358/1.14; 358/518

(58) Field of Classification Search
USPC .............. 358/1.9, 2.1, 3.27, 3.28, 1.14, 1.18, 358/500, 501, 518, 523, 530
See application file for complete search history.

(56) References Cited

U.S. PATENT DOCUMENTS

| 6,153,879 | A | * | 11/2000 | Yoshinaga et al. ............. 250/271 |
| 7,826,112 | B2 | * | 11/2010 | Sawada .......................... 358/520 |
| 8,045,242 | B2 | * | 10/2011 | Sawada .......................... 358/520 |
| 8,482,325 | B2 | * | 7/2013 | Ohmine ........................ 358/1.11 |
| 2004/0255808 | A1 | | 12/2004 | Nagashima |
| 2005/0128498 | A1 | | 6/2005 | Matsuzaki |
| 2011/0032553 | A1 | * | 2/2011 | Funahashi ...................... 358/1.9 |
| 2012/0127492 | A1 | * | 5/2012 | Harada et al. .................. 358/1.9 |
| 2013/0057880 | A1 | * | 3/2013 | Yokoi et al. .................... 358/1.9 |

FOREIGN PATENT DOCUMENTS

JP 3544536 B2 7/2004

OTHER PUBLICATIONS

U.S. Appl. No. 13/277,064 by Koji Harada, filed Oct. 19, 2011.
U.S. Appl. No. 13/287,693 by Junichi Hayashi, filed Nov. 2, 2011.

\* cited by examiner

*Primary Examiner* — Scott A Rogers
(74) *Attorney, Agent, or Firm* — Fitzpatrick, Cella, Harper & Scinto

(57) ABSTRACT

For a selected pixel value, amounts of color material used of respective color materials used to print a background region, and those of respective color materials used to print a latent image region are calculated. The calculated amounts of color material used are stored in a memory in association with the selected pixel value. Amounts of color material used corresponding to respective pixel values of a pixel value group are read out from the memory, and are output to a printing apparatus.

9 Claims, 26 Drawing Sheets

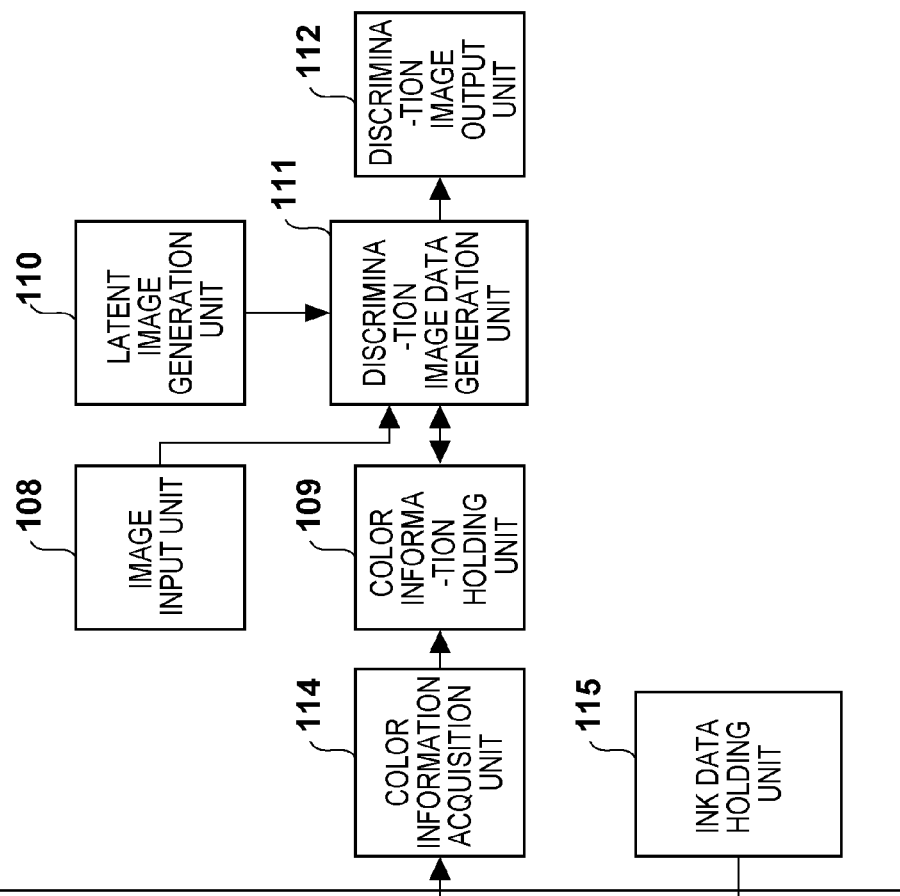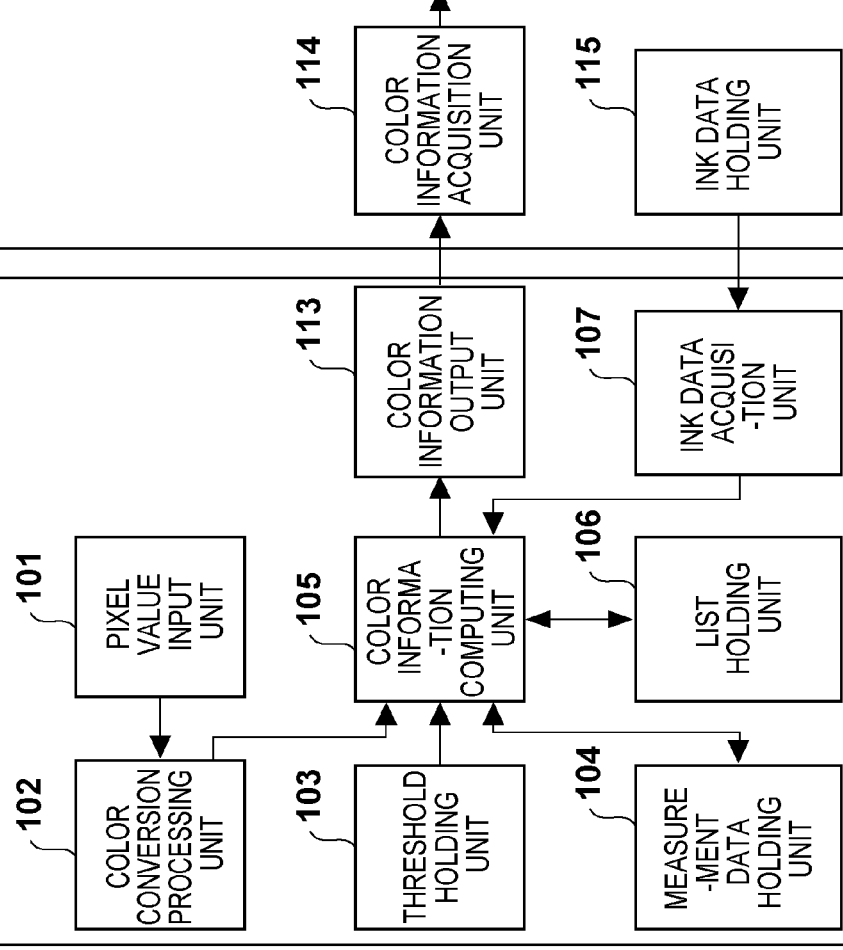

FIG. 1B
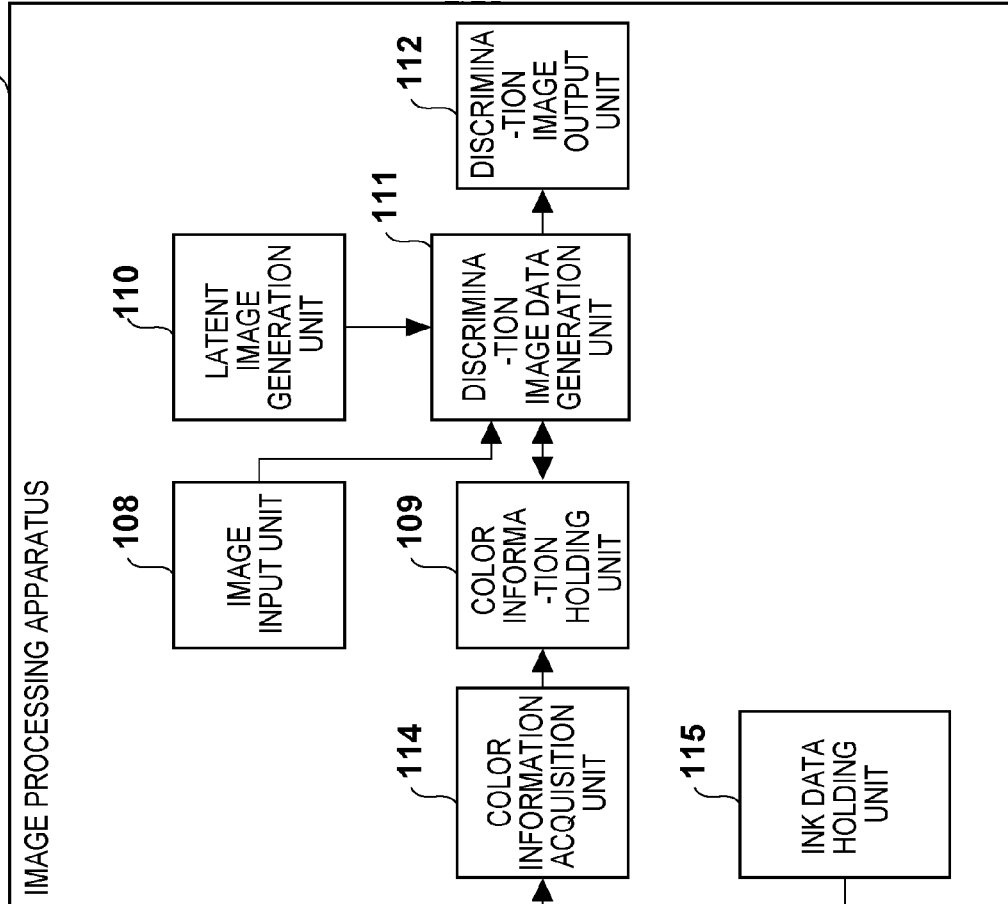
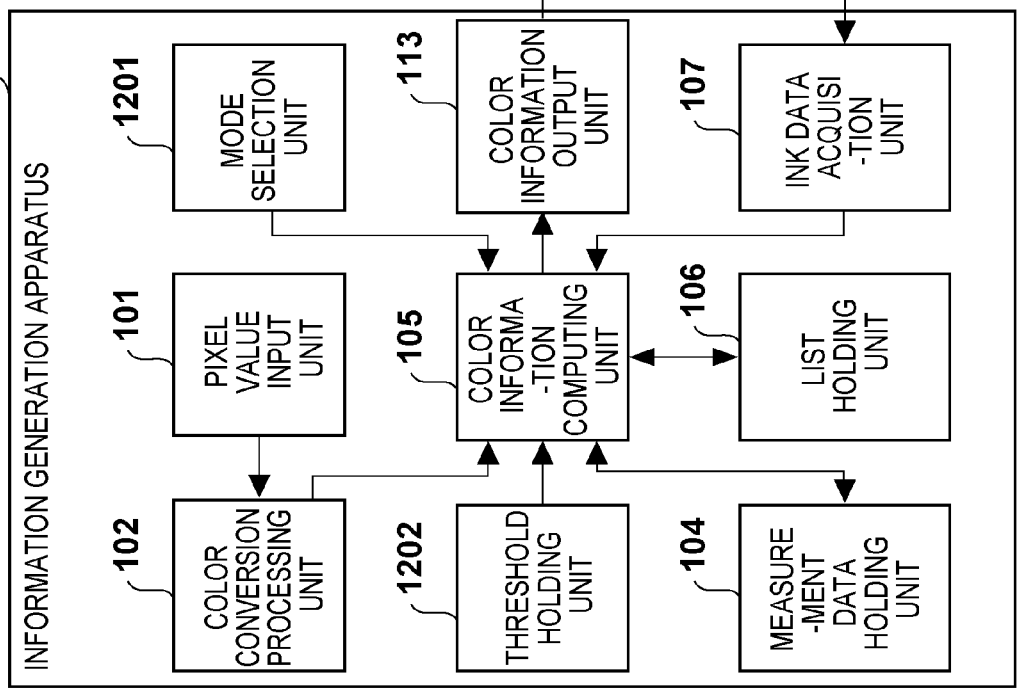

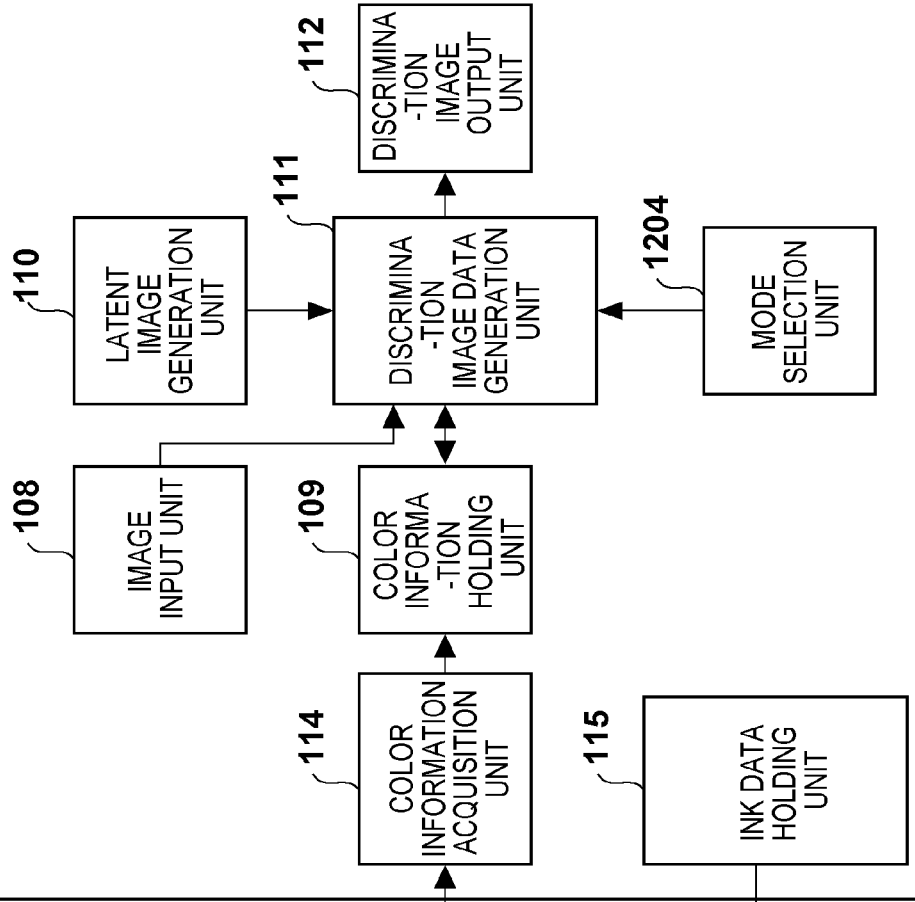
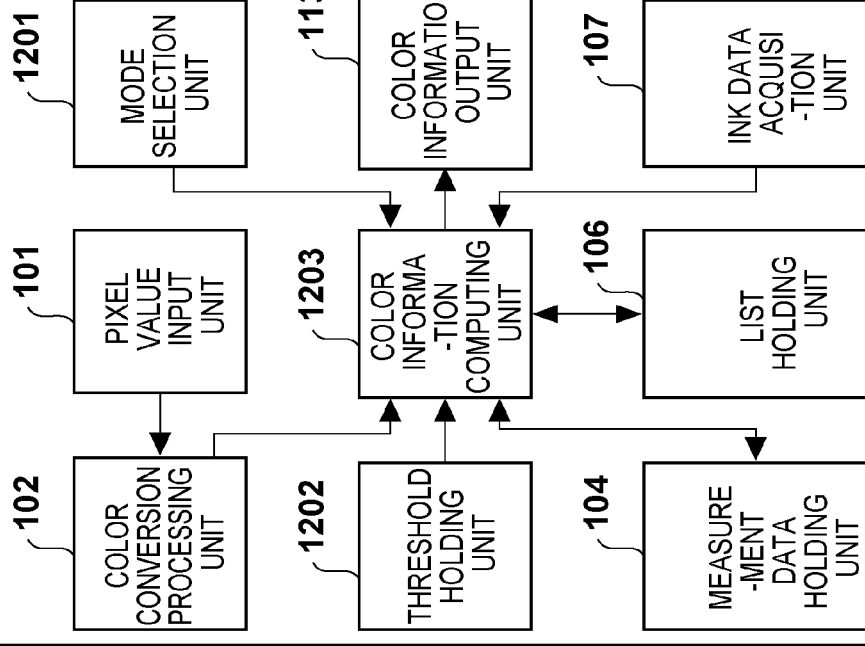

☐ COLOR GAMUT OF FIRST REGION: c, m, y
⋯ COLOR GAMUT OF SECOND REGION: c, m, y + k(50)
▨ COLOR GAMUT USABLE FOR DISCRIMINATION IMAGE

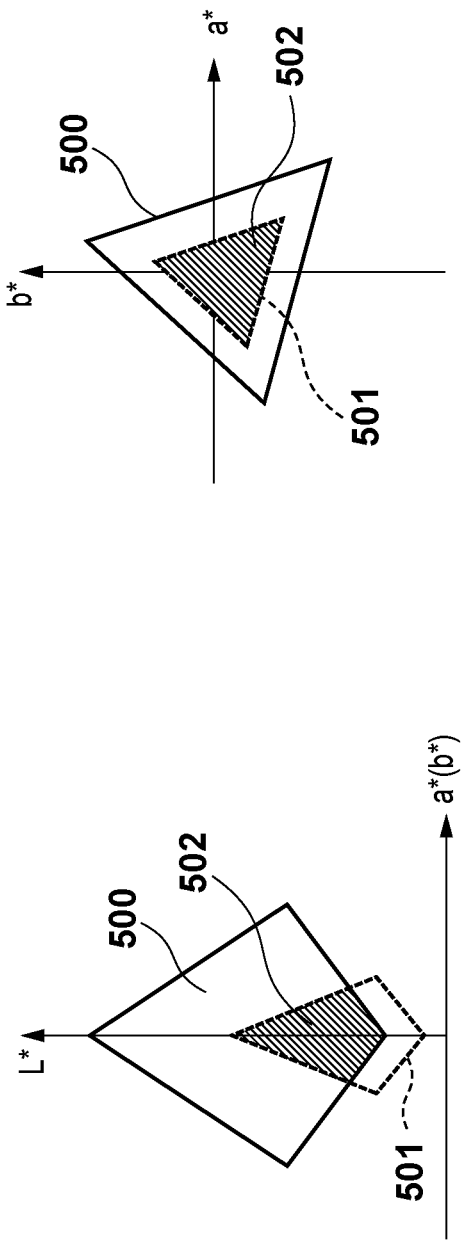

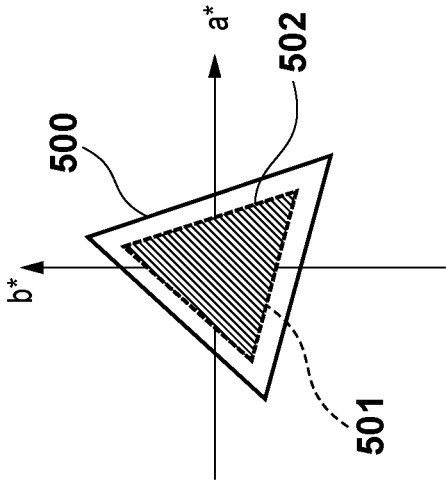
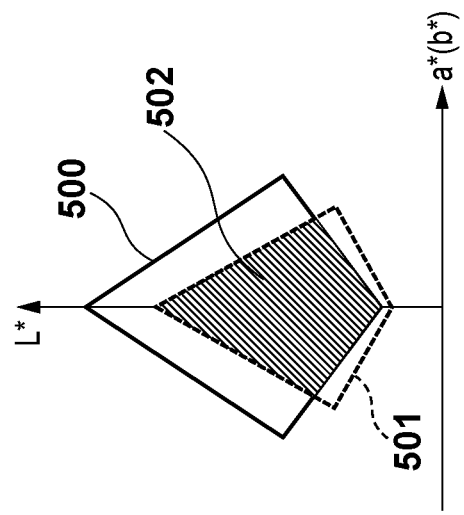
FIG. 5E / FIG. 5F
☐ COLOR GAMUT OF FIRST REGION: c, m, y
┆┄┆ COLOR GAMUT OF SECOND REGION: c, m, y + k(5)
▨ COLOR GAMUT USABLE FOR DISCRIMINATION IMAGE ☐ COLOR GAMUT OF FIRST REGION: c, m, y
⌐⌐⌐ COLOR GAMUT OF SECOND REGION: r, b + g
▨▨▨ COLOR GAMUT USABLE FOR DISCRIMINATION IMAGE

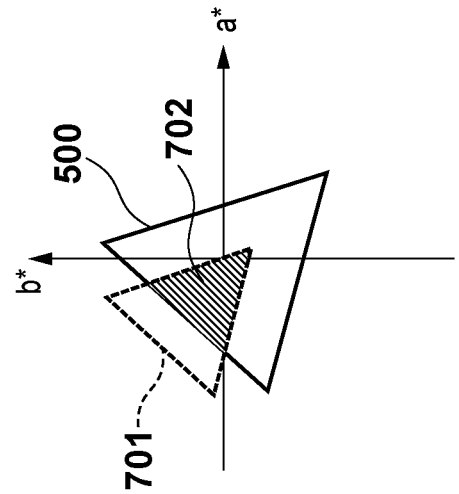
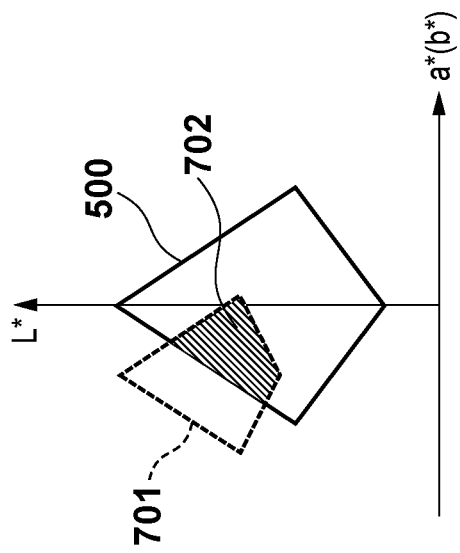

FIG. 8A

| AMOUNT OF INK USED | | | COLOR MEASUREMENT DATA | | |
|---|---|---|---|---|---|
| c | m | y | L* | a* | b* |
| c1 | m1 | y1 | L*1 | a*1 | b*1 |
| c2 | m2 | y2 | L*2 | a*2 | b*2 |
| c3 | m3 | y3 | L*3 | a*3 | b*3 |
| c4 | m4 | y4 | L*4 | a*4 | b*4 |
| : | : | : | : | : | : |

| AMOUNT OF INK USED | | | | COLOR MEASUREMENT DATA | | |
|---|---|---|---|---|---|---|
| c | m | y | k | L* | a* | b* |
| c51 | m51 | y51 | 5 | L*51 | a*51 | b*51 |
| c52 | m52 | y52 | 5 | L*52 | a*52 | b*52 |
| c53 | m53 | y53 | 5 | L*53 | a*53 | b*53 |
| c54 | m54 | y54 | 5 | L*54 | a*54 | b*54 |
| : | : | : | : | : | : | : |

822

| AMOUNT OF INK USED | | | | COLOR MEASUREMENT DATA | | |
|---|---|---|---|---|---|---|
| c | m | y | k | L* | a* | b* |
| c21 | m21 | y21 | 2 | L*21 | a*21 | b*21 |
| c22 | m22 | y22 | 2 | L*22 | a*22 | b*22 |

821

| AMOUNT OF INK USED | | | | COLOR MEASUREMENT DATA | | |
|---|---|---|---|---|---|---|
| c | m | y | k | L* | a* | b* |
| c11 | m11 | y11 | 1 | L*11 | a*11 | b*11 |
| c12 | m12 | y12 | 1 | L*12 | a*12 | b*12 |
| c13 | m13 | y13 | 1 | L*13 | a*13 | b*13 |
| c14 | m14 | y14 | 1 | L*14 | a*14 | b*14 |
| : | : | : | : | : | : | : |

| AMOUNT OF INK USED | | | COLOR MEASUREMENT DATA | | |
|---|---|---|---|---|---|
| r | b | g | L* | a* | b* |
| r101 | b101 | 10 | L*101 | a*101 | b*101 |
| r102 | b102 | 10 | L*102 | a*102 | b*102 |
| r103 | b103 | 10 | L*103 | a*103 | b*103 |
| r104 | b104 | 10 | L*104 | a*104 | b*104 |
| : | : | : | : | : | : |

832

| AMOUNT OF INK USED | | | COLOR MEASUREMENT DATA | | |
|---|---|---|---|---|---|
| r | b | g | L* | a* | b* |
| r21 | b21 | 2 | L*21 | a*21 | b*21 |
| r22 | b22 | 2 | L*22 | a*22 | b*22 |

| AMOUNT OF INK USED | | | COLOR MEASUREMENT DATA | | |
|---|---|---|---|---|---|
| r | b | g | L* | a* | b* |
| r11 | b11 | 1 | L*11 | a*11 | b*11 |
| r12 | b12 | 1 | L*12 | a*12 | b*12 |
| r13 | b13 | 1 | L*13 | a*13 | b*13 |
| r14 | b14 | 1 | L*14 | a*14 | b*14 |
| : | : | : | : | : | : |

| AMOUNT OF INK USED | | | | COLOR MEASUREMENT DATA | | |
|---|---|---|---|---|---|---|
| c | m | y | g | L* | a* | b* |
| c101 | m101 | y101 | 10 | L*101 | a*101 | b*101 |
| c102 | m102 | y102 | 10 | L*102 | a*102 | b*102 |
| c103 | m103 | y103 | 10 | L*103 | a*103 | b*103 |
| c104 | m104 | y104 | 10 | L*104 | a*104 | b*104 |
| : | : | : | : | : | : | : |

842

| AMOUNT OF INK USED | | | | COLOR MEASUREMENT DATA | | |
|---|---|---|---|---|---|---|
| c | m | y | g | L* | a* | b* |
| c21 | m21 | y21 | 2 | L*21 | a*21 | b*21 |
| c22 | m22 | y22 | 2 | L*22 | a*22 | b*22 |

841

| AMOUNT OF INK USED | | | | COLOR MEASUREMENT DATA | | |
|---|---|---|---|---|---|---|
| c | m | y | g | L* | a* | b* |
| c11 | m11 | y11 | 1 | L*11 | a*11 | b*11 |
| c12 | m12 | y12 | 1 | L*12 | a*12 | b*12 |
| c13 | m13 | y13 | 1 | L*13 | a*13 | b*13 |
| c14 | m14 | y14 | 1 | L*14 | a*14 | b*14 |
| : | : | : | : | : | : | : |

FIG. 10

| PIXEL VALUE (RGB VALUES) | COLOR INFORMATION Ci ||||||||||||||||
|---|---|---|---|---|---|---|---|---|---|---|---|---|---|---|---|---|
| | COLOR INFORMATION No. | FIRST COLOR C1 |||||| SECOND COLOR C2 |||||| INK COMBINATION |
| | | c | m | y | k | r | g | b | c | m | y | k | r | g | b | |
| ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ |
| (R1,G1,B1) | Ci1 | 10 | 28 | 8 | 0 | 0 | 0 | 0 | 8 | 26 | 5 | 5 | 0 | 0 | 0 | (No.1) |
| ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ |
| (R2,G2,B2) | Ci2 | 20 | 0 | 6 | 0 | 0 | 0 | 0 | 0 | 0 | 0 | 0 | 2 | 10 | 5 | (No.2) |
| ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ |
| (R3,G3,B3) | Ci3 | 40 | 4 | 40 | 0 | 0 | 0 | 0 | 35 | 2 | 35 | 0 | 0 | 10 | 0 | (No.3) |
| ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ | ⋯ |

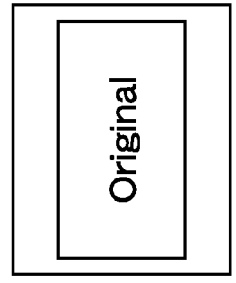
FIG. 13A
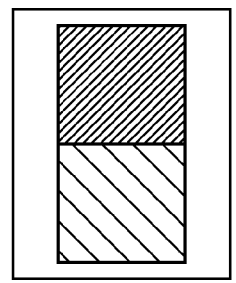
FIG. 13B
FIG. 13C
UNDER ORDINARY LIGHT
FIG. 13D
UNDER INFRARED LIGHT
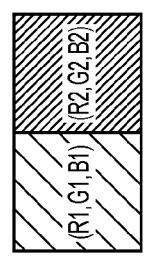

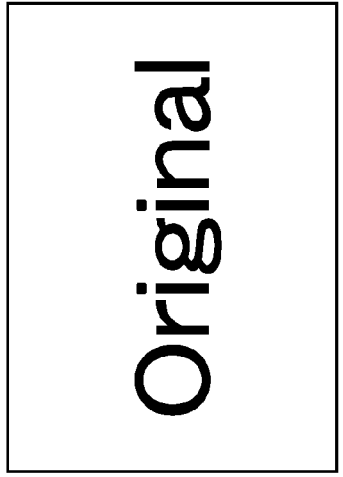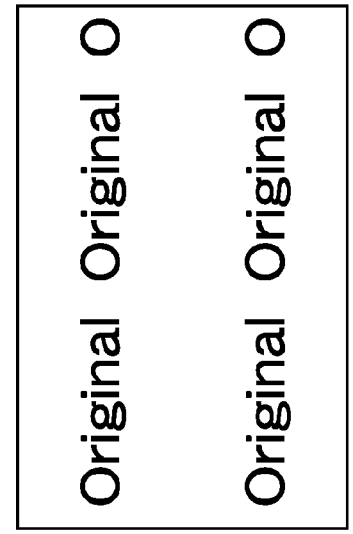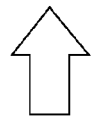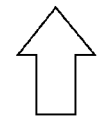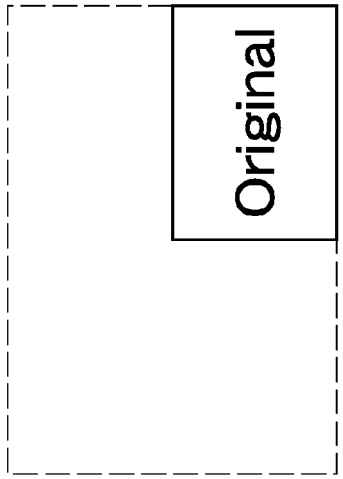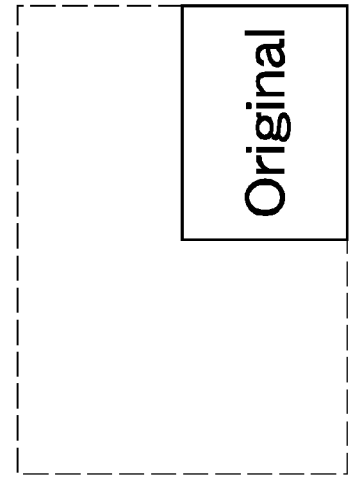
F I G. 14A
F I G. 14B
F I G. 14C $$\vec{AP} = s\vec{AB} + t\vec{AC} + u\vec{AD}$$

FIG. 17

| No | INK COMBINATION | |
| --- | --- | --- |
| | FIRST COLOR | SECOND COLOR |
| 1 | CYAN (c), MAGENTA (m), YELLOW (y) | CYAN (c), MAGENTA (m), YELLOW (y),BLACK (k) |
| 2 | CYAN (c), MAGENTA (m), YELLOW (y) | RED (r), BLUE (b), GREEN (g) |
| 3 | CYAN (c), MAGENTA (m), YELLOW (y) | CYAN (c), MAGENTA (m), YELLOW (y),GREEN (g) |
| ⋮ | ⋮ | ⋮ |

IMAGE PROCESSING APPARATUS, METHOD, AND PROGRAM PRODUCT FOR GENERATING A COLOR IMAGE VISIBLE UNDER ORDINARY LIGHT WITH A LATENT IMAGE REGION EASILY DISCRIMINATED UNDER INFRARED LIGHT

BACKGROUND OF THE INVENTION

1. Field of the Invention

The present invention relates to a technique for visualizing patterns and characters on a printing medium.

2. Description of the Related Art

As an anti-counterfeit technique or authenticity determination technique of printed matters, a printing method for generating a printed matter which cannot be visually recognized (or is hard to be visually recognized) under ordinary light but can be easily discriminated using a device such as an infrared camera sensitive to an infrared range under infrared light is available.

As a representative printing method, a method disclosed in Japanese Patent No. 3544536 is known. This method uses the fact that only a black (k) color material of color components of cyan (c), magenta (m), yellow (y), and black (k) used in general print processing has large infrared absorption characteristics. That is, an image is printed on a printing medium using black (k) having large infrared absorption characteristics for a latent image region, and using cyan (c), magenta (m), and yellow (y) having small infrared absorption characteristics for a background region. Then, the output printing medium is irradiated with infrared light, and a latent image is discriminated using an infrared camera.

However, with the above method, since a latent image region is formed using only black (k), it is expressed by only a black-based achromatic color. In order to prevent the latent image region from being visually recognized under ordinary light, a background region also has to be expressed by an achromatic color. Hence, a print image is expressed by only black-based achromatic colors, thus posing a problem. For this reason, a print image, which is formed using a plurality of colors, and has the aforementioned latent image region and background region, cannot be generated.

SUMMARY OF THE INVENTION

The present invention has been made in consideration of the aforementioned problems, and provides a technique required to generate an image which can be expressed using multiple colors under ordinary light, and has a latent image region that can be easily discriminated under infrared light.

According to the first aspect of the present invention, there is provided an information generation apparatus comprising: a first holding unit that holds sets of color values acquired by measuring, in advance, colors of patterns printed using a first color material group including color materials of a plurality of colors by amounts of color material used, which are set for the respective color materials, and the amounts of color material used, which are set for the respective color materials of the first color material group, for respective combinations of the amounts of color material used, which are allowed to be set for the respective color materials of the first color material group; a second holding unit that holds sets of color values acquired by measuring, in advance, colors of patterns printed using a second color material group including a color material having a higher infrared ray absorption rate than the plurality of color materials by amounts of color material used, which are set for the respective color materials, and the amounts of color material used, which are set for the respective color materials of the second color material group, for respective combinations of the amounts of color material used, which are allowed to be set for the respective color materials of the second color material group; a unit that selects one pixel value from a pixel value group, which is set in advance, as a selected pixel value; a first calculation unit that specifies color values, differences from a color value of the selected pixel value of which fall within a prescribed range, from a color value group held by the first holding unit on a color space, to which that color value group belongs, specifies amounts of color material used held by the first holding unit to be set with the specified color values, and calculates amounts of color material used of respective color materials, used when a pixel having the selected pixel value is to be printed using the first color material group, by interpolation from the specified amounts of color material used; a second calculation unit that specifies color values, differences from a color value of the selected pixel value of which fall within a prescribed range, from a color value group held by the second holding unit on a color space, to which that color value group belongs, specifies amounts of color material used held by the second holding unit to be set with the specified color values, and calculates amounts of color material used of respective color materials, used when a pixel having the selected pixel value is to be printed using the second color material group, by interpolation from the specified amounts of color material used; a unit that stores, in a memory, the amounts of color material used of the respective color materials of the first color material group calculated by the first calculation unit and the amounts of color material used of the respective color materials of the second color material group calculated by the second calculation unit in association with the selected pixel value; and an output unit that reads out from the memory the amounts of color material used of the respective color materials of the first color material group and the amounts of color material used of the respective color materials of the second color material group, which respectively correspond to pixel values of the pixel value group, which is set in advance, and outputs the readout amounts to a printing apparatus.

According to the second aspect of the present invention, there is provided an information generation method executed by an information generation apparatus, which comprises: a first holding unit that holds sets of color values acquired by measuring, in advance, colors of patterns printed using a first color material group including color materials of a plurality of colors by amounts of color material used, which are set for the respective color materials, and the amounts of color material used, which are set for the respective color materials of the first color material group, for respective combinations of the amounts of color material used, which are allowed to be set for the respective color materials of the first color material group; and a second holding unit that holds sets of color values acquired by measuring, in advance, colors of patterns printed using a second color material group including a color material having a higher infrared ray absorption rate than the plurality of color materials by amounts of color material used, which are set for the respective color materials, and the amounts of color material used, which are set for the respective color materials of the second color material group, for respective combinations of the amounts of color material used, which are allowed to be set for the respective color materials of the second color material group, the method comprising: a step of controlling a selection unit of the information processing apparatus to select one pixel value from a pixel value group, which is set in advance, as a selected pixel value; a first calculation step of controlling a first calculation unit of the information generation apparatus to specify color values, differences from a color value of the selected pixel value of which fall within a prescribed range, from a color value group held by the first holding unit on a color space, to which that color value group belongs, to specify amounts of color material used held by the first holding unit to be set with the specified color values, and to calculate amounts of color material used of respective color materials, used when a pixel having the selected pixel value is to be printed using the first color material group, by interpolation from the specified amounts of color material used; a second calculation step of controlling a second calculation unit of the information generation apparatus to specify color values, differences from a color value of the selected pixel value of which fall within a prescribed range, from a color value group held by the second holding unit on a color space, to which that color value group belongs, to specify amounts of color material used held by the second holding unit to be set with the specified color values, and to calculate amounts of color material used of respective color materials, used when a pixel having the selected pixel value is to be printed using the second color material group, by interpolation from the specified amounts of color material used; a step of controlling a storage unit of the information generation apparatus to store, in a memory, the amounts of color material used of the respective color materials of the first color material group calculated in the first calculation step and the amounts of color material used of the respective color materials of the second color material group calculated in the second calculation step in association with the selected pixel value; and an output step of controlling an output unit of the information generation apparatus to read out from the memory the amounts of color material used of the respective color materials of the first color material group and the amounts of color material used of the respective color materials of the second color material group, which respectively correspond to pixel values of the pixel value group, which is set in advance, and to output the readout amounts to a printing apparatus.

According to the third aspect of the present invention, there is provided an image processing apparatus comprising: a first holding unit that holds, for respective pixel values which are set in advance, amounts of color material used of respective color materials used when a color of the pixel value is printed using a plurality of colors of color materials; a second holding unit that holds, for the respective pixel values which are set in advance, amounts of color material used of respective color materials used when a color of the pixel value is printed using a plurality of colors of color materials including a color material having a higher infrared ray absorption rate than the plurality of color materials; a unit that judges whether each pixel which configures a print target image belongs to a latent image region or a background region; and a unit that acquires, when a pixel of interest belongs to the latent image region, amounts of color material used of respective color materials corresponding to a pixel value of the pixel of interest from the second holding unit, and prints the pixel of interest on a printing medium according to the acquired amounts of color material used of the respective color materials, and acquires, when the pixel of interest belongs to the background region, amounts of color material used of respective color materials corresponding to a pixel value of the pixel of interest from the first holding unit, and prints the pixel of interest on the printing medium according to the acquired amounts of color material used of the respective color materials, wherein lightness of a pixel which is printed according to amounts of color material used of respective color materials held by the first holding unit in association with a pixel value of interest, and lightness of a pixel which is printed according to amounts of color material used of respective color materials held by the second holding unit in association with the pixel value of interest are hard to be visually recognized under ordinary light.

According to the fourth aspect of the present invention, there is provided an image processing method executed by an image processing apparatus, which comprises: a first holding unit that holds, for respective pixel values which are set in advance, amounts of color material used of respective color materials used when a color of the pixel value is printed using a plurality of colors of color materials; and a second holding unit that holds, for the respective pixel values which are set in advance, amounts of color material used of respective color materials used when a color of the pixel value is printed using a plurality of colors of color materials including a color material having a higher infrared ray absorption rate than the plurality of color materials, the method comprising: a step of controlling a judging unit of the image processing apparatus to judge whether each pixel which configures a print target image belongs to a latent image region or a background region; and a step of controlling a print unit of the image processing apparatus to acquire, when a pixel of interest belongs to the latent image region, amounts of color material used of respective color materials corresponding to a pixel value of the pixel of interest from the second holding unit, and to print the pixel of interest on a printing medium according to the acquired amounts of color material used of the respective color materials, and to acquire, when the pixel of interest belongs to the background region, amounts of color material used of respective color materials corresponding to a pixel value of the pixel of interest from the first holding unit, and to print the pixel of interest on the printing medium according to the acquired amounts of color material used of the respective color materials, wherein lightness of a pixel which is printed according to amounts of color material used of respective color materials held by the first holding unit in association with a pixel value of interest, and lightness of a pixel which is printed according to amounts of color material used of respective color materials held by the second holding unit in association with the pixel value of interest are hard to be visually recognized under ordinary light.

Further features of the present invention will become apparent from the following description of exemplary embodiments with reference to the attached drawings.

BRIEF DESCRIPTION OF THE DRAWINGS

FIGS. 1A to 1C are block diagrams showing examples of the functional arrangements of a system;

FIGS. 5A to 5F are views showing color gamuts of first and second regions on a CIE L*a*b* space;

FIGS. 7A and 7B are views showing color gamuts of the first and second regions on the CIE L*a*b* space;

FIGS. 8A to 8D are views each showing configuration examples of information held by a measurement data holding unit 104;

FIG. 10 is a table showing a configuration example of color information;

FIGS. 13A to 13D are views showing a print target image, latent image, print target image under ordinary light, and that under infrared light;

FIGS. 14A to 14C are views for explaining enlargement, reduction, and repetitive pasting of a latent image Ic;

FIG. 17 is a table showing a configuration example of a list; and

DESCRIPTION OF THE EMBODIMENTS

Embodiments of the present invention will be described hereinafter with reference to the accompanying drawings. Note that an embodiment to be described hereinafter is an example when the present invention is practically carried out, and is one of practical embodiments of the arrangements described in the scope of the claims.

[First Embodiment]

Figure 3A:
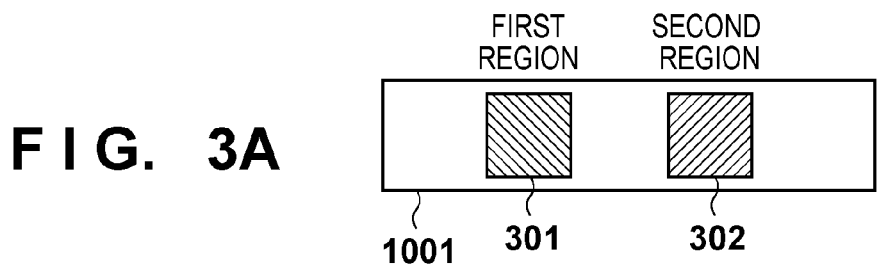
FIGS. 3A to 3E are views for explaining the basic concept of an embodiment.
Figure 3B:
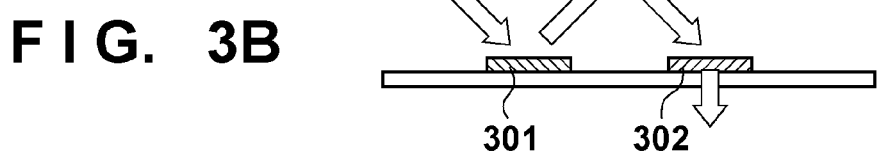
Figure 3C:
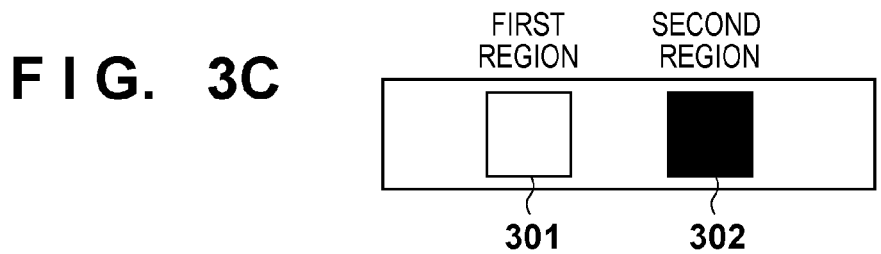

The basic principle of this embodiment will be briefly described first with reference to FIGS. 3A to 3E. Referring to FIG. 3A, a first region 301 is printed using a color material having small infrared absorption characteristics (low infrared ray absorption rate), and a second region 302 is printed using a color material having large infrared absorption characteristics. Both of these regions are printed on a printing medium 1001. FIG. 3B shows the printing medium 1001 when viewed from the side surface of the plane of the drawing. When this printing medium 1001 is irradiated with infrared light IR, the first region 301 reflects the infrared light IR since it has the small infrared absorption characteristics, and the second region 302 absorbs the infrared light IR since it has the large infrared absorption characteristics. Therefore, when this printing medium 1001 is observed using an infrared camera while it is irradiated with the infrared light IR, the first region 301 is observed to have a high lightness level, and the second region 302 is observed to have a low lightness level, as shown in FIG. 3C. Note that color materials can be either pigment inks or toners, and they (first color material group, second color material group, and third color material group) will be simply referred to as inks (first ink group, second ink group, and third ink group) hereinafter.

Of four basic color inks, that is, cyan (c), magenta (m), yellow (y), and black (k) used in general print processing, black (k) is a black color material mainly containing carbon black, and has higher absorption of infrared light (infrared absorption characteristics are large). By contrast, cyan (c), magenta (m), and yellow (y) have lower absorption of infrared light (infrared absorption characteristics are small), as is known. Therefore, when the second region 302 is printed using black (k), and the first region 301 is printed using cyan (c), magenta (m), and yellow (y), the first region 301 is observed to have a high lightness level, and the second region 302 is observed to have a low lightness level, as described above. Furthermore, in order to obscure a color difference between the first region 301 and second region 302 under ordinary light, the first region 301 can be printed using a combination of cyan (c), magenta (m), and yellow (y) to have nearly the same color as that of the second region 302. In this case, ordinary light is D50 as light for colorimetry, a relative spectral distribution of which is specified by CIE (Commission Internationale de l'Éclairage).

Assume that on the printing medium 1001, a region of characters, a pattern, a mark, or the like (latent image region) is printed as the second region 302, and a region (background region) other than the latent image region is printed as the first region 301. At this time, the latent image region cannot be visually recognized (or it is hard to be visually recognized) under ordinary light, but it is visualized when this printing medium 1001 is observed using a special discrimination device such as an infrared camera under infrared light.

Figure 3D:
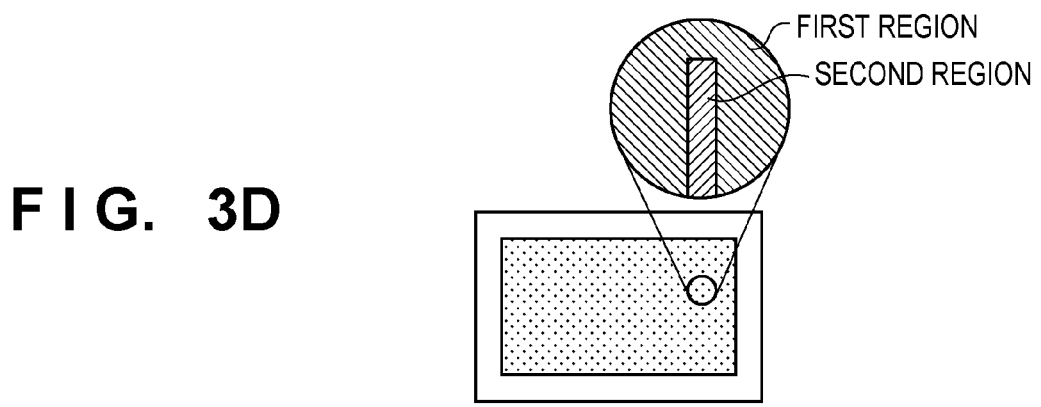
Figure 3E:

Therefore, in order to allow the user to observe an image shown in FIG. 3E upon observing the printing medium 1001 using an infrared camera while the printing medium 1001 is irradiated with infrared light, the image shown in FIG. 3E is printed as follows. That is, a text portion "Original" is printed as the second region 302, and a non-text portion is printed as the first region 301, as shown in FIG. 3D.

This technique can attain the following authenticity determination. That is, for example, when the printing medium 1001 is irradiated with infrared light, and a specific latent image is confirmed on the printing medium 1001, it is determined that the printing medium 1001 is authentic; when no latent image is confirmed, it is determined that the printing medium 1001 is inauthentic.

Note that recently, a printing apparatus, which also mounts three expansion color inks, that is, red (r), green (g), and blue (b) in addition to the aforementioned four basic color inks, so as to expand a color gamut that can be expressed, is available. It is known that green (g) of these three expansion color inks is a green color material mainly containing copper and chromium, and absorbs infrared light.

Figure 4:
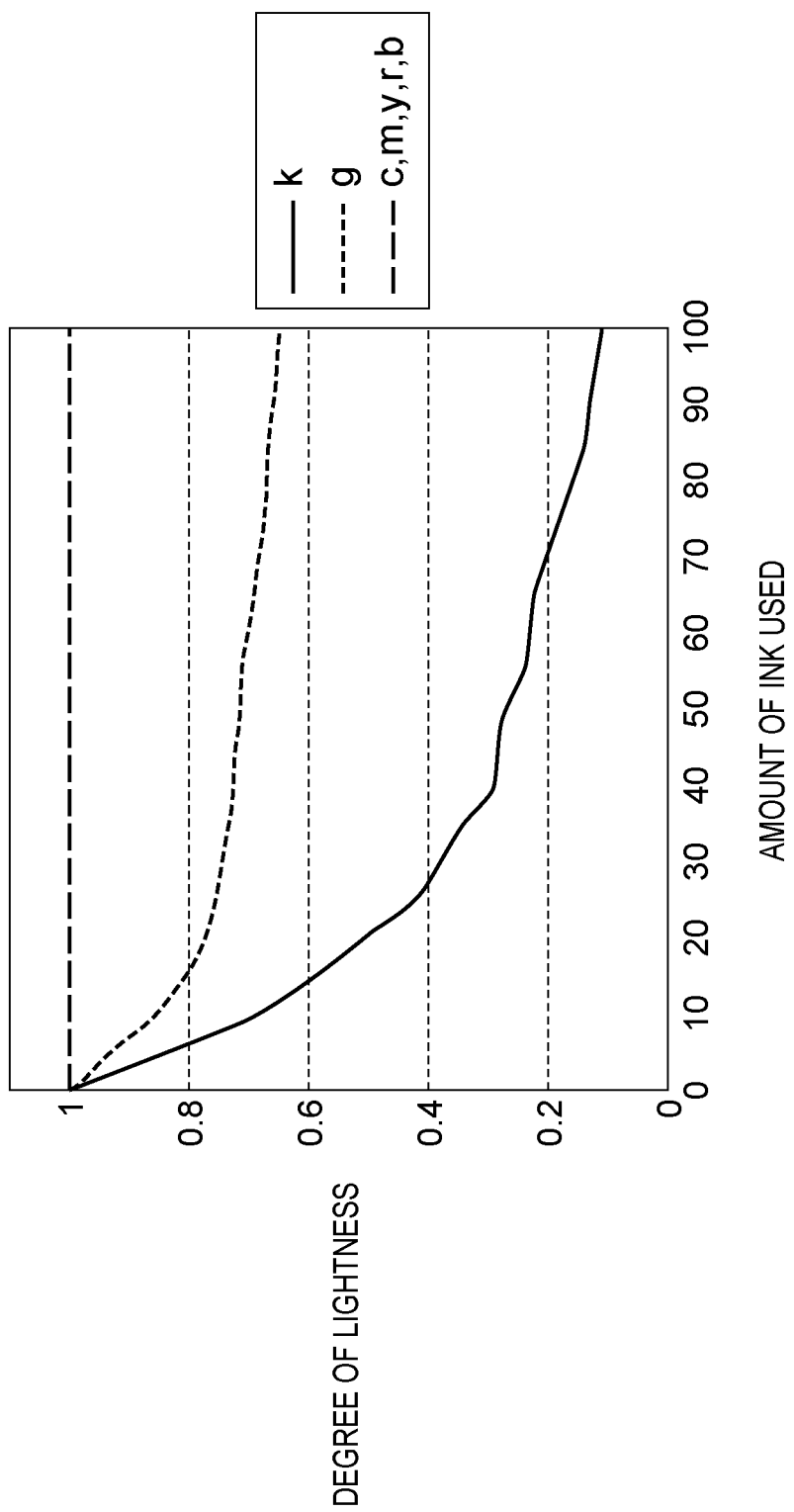
FIG. 4 is a graph showing degrees of lightness with respect to amounts of ink used per unit area of respective unicolor inks.

FIG. 4 shows a graph which expresses degrees of lightness (ordinate) with respect to changes in amount of ink used (abscissa) per unit area of respective unicolor inks (cyan, magenta, yellow, black, red, green, and blue). This graph is obtained by printing a plurality of measurement patches whose amounts of ink used per unit area are changed for respective unicolor inks on a printing medium, measuring lightness levels using an infrared camera in an environment in which the patches are irradiated with infrared light, and converting numerical values into a graph. Note that a lightness level of the printing medium on which the measurement patches are printed is defined as "1". As can be confirmed from this graph, the infrared absorption characteristics of black (k) and green (g) are greater than the remaining inks, and degrees of lightness are different depending on ink types even when the amount of ink used remains the same. Also, as can be seen from this graph, the degree of lightness is decreased with increasing amount of ink used.

When a latent image is to be visualized on an image, only one of the latent image region and background region need only contain an ink having large infrared absorption characteristics as a consequence. In other words, two regions having different infrared absorption characteristics need only be formed on an image purposely. Then, as can also be seen from FIG. 4, when the amount of ink used of an ink having large infrared absorption characteristics in one region is small, a lightness difference with the other region is reduced under infrared light, and that region can be discriminated to be paler under infrared light. On the other hand, when the amount of ink used of an ink having large infrared absorption character-istics is large in one region, a lightness difference with the other region is large under infrared light, and that region is discriminated to be clear under infrared light.

Hence, in this embodiment, the latent image region is printed using both an ink having large infrared absorption characteristics, and that having small infrared absorption characteristics. In this case, the amount of ink used of the ink having the large infrared absorption characteristics is reduced within a range in which the latent image can be discriminated under infrared light. Then, the number of colors that can be used to print an image having the latent image region and background region can be increased.

In the following description, the ink having the large infrared absorption characteristics is used to print the latent image region in place of the background region. Conversely, the ink having the large infrared absorption characteristics may be used to print the background region in place of the latent image region. That is, the ink having the large infrared absorption characteristics can be used in either region as long as a lightness difference between the background region and latent image region is hardly recognized (visually recognized) by the user under ordinary light, and that difference stands out upon observing these regions using an infrared camera under infrared light.

FIGS. 5A to 5F show color gamuts which can be expressed by the first and second regions on a CIE L*a*b* color space when the first region is formed using cyan (c), magenta (m), and yellow (y), and the second region is formed using cyan (c), magenta (m), yellow (y), and black (k). The first and second regions are either of the latent image region and background region.

Figure 5A:
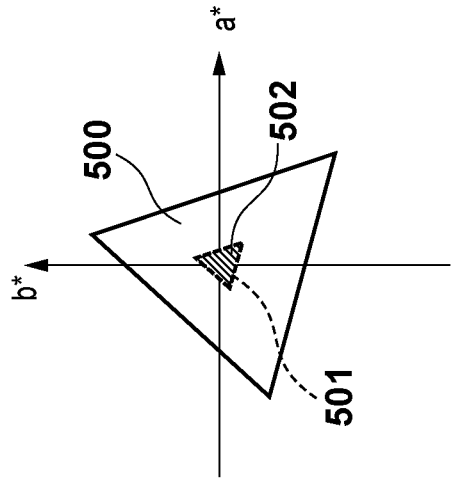
Figure 5B:
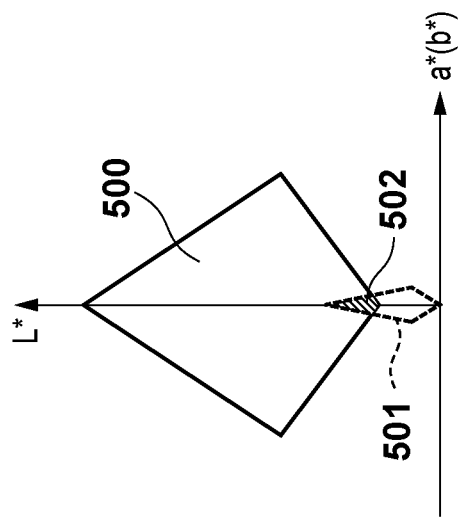

FIG. 5A shows a color gamut which can be expressed by the respective regions on an L*-a* plane and FIG. 5B shows that on an a*-b* plane, when the amount of ink used of black is 50.

FIG. 5C shows a color gamut which can be expressed by the respective regions on the L*-a* plane and FIG. 5D shows that on the a*-b* plane, when the amount of ink used of black is 20.

FIG. 5E shows a color gamut which can be expressed by the respective regions on the L*-a* plane and FIG. 5F shows that on the a*-b* plane, when the amount of ink used of black is 5.

An overlapping region (hatched region in each of FIGS. 5A to 5F) between a color gamut 500 of the first region and a color gamut 501 of the second region is a color gamut 502 which can be used for an image including the first and second regions. As shown in FIGS. 5A to 5F, when the amount of ink used of the black ink is reduced in turn to 50, 20, and 5, since the overlapping region is broadened, that is, the color gamut that can be used for an image is broadened, the number of colors used for the image is consequently increased. Furthermore, when three expansion color inks can be used, the number of colors that can be used for the image can be increased by using these three expansion color inks for the latent image region.

Figure 6A:
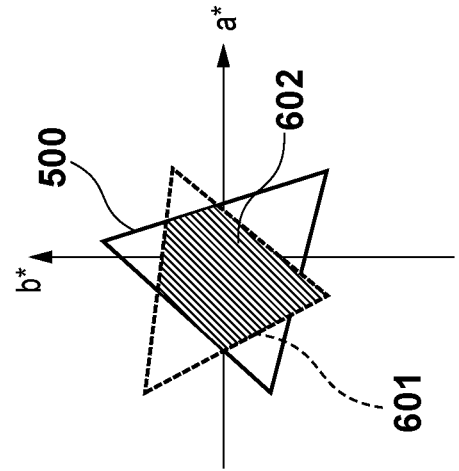
FIGS. 6A and 6B are views showing color gamuts of the first and second regions on the CIE L*a*b* space.
Figure 6B:
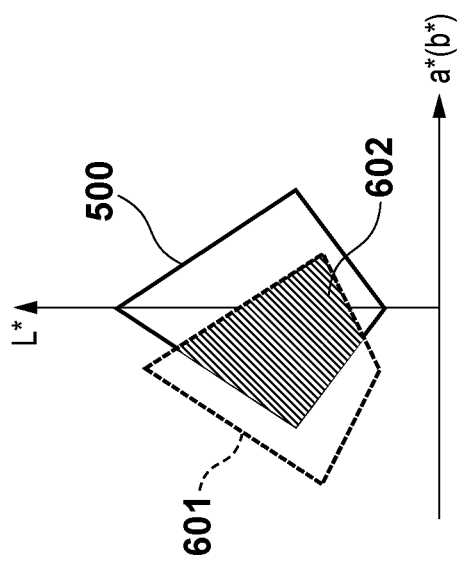

FIGS. 6A and 6B show color gamuts which can be expressed by the first and second regions on the CIE L*a*b* space when the first region is formed using cyan (c), magenta (m), and yellow (y), and the second region is formed using red (r), blue (b), and green (g). FIG. 6A shows the color gamut expressed on the L*-a* plane, and FIG. 6B shows that expressed on the a*-b* plane. In FIGS. 6A and 6B, an overlapping region (hatched region in each of FIGS. 6A and 6B) between the color gamut 500 of the first region and a color gamut 601 of the second region is a color gamut 602 which can be used for an image including the first and second regions.

FIGS. 7A and 7B show color gamuts which can be expressed by the first and second regions on the CIE L*a*b* space when the first region is formed using cyan (c), magenta (m), and yellow (y), and the second region is formed using cyan (c), magenta (m), yellow (y), and green (g). FIG. 7A shows the color gamut expressed on the L*-a* plane, and FIG. 7B shows that expressed on the a*-b* plane. In FIGS. 7A and 7B, an overlapping region (hatched region in each of FIGS. 7A and 7B) between the color gamut 500 of the first region and a color gamut 701 of the second region is a color gamut 702 which can be used for an image including the first and second regions.

The technique of this embodiment and subsequent embodiments has been made while focusing on such points, and the number of colors that can be used for an image including the latent image region and background region is increased by changing the amount of ink used of an ink having large infrared absorption characteristics, and combinations of inks. As a result, the first region (background region) and second region (latent image region) are hard to be distinguished under ordinary light, as shown in FIG. 3D, and these two regions can be easily discriminated under infrared light, as shown in FIG. 3E.

<Color Information Generation Method>

A color information generation method will be described first. Color information is configuration information indicating inks and amounts (amounts of ink used) to be used on a printing medium so as to express a color of each of pixel values (RGB values) which can be printed on the printing medium. As shown in FIG. 10, in the color information, amounts of ink used (=first color C1) of respective inks used to print the background region and those (=second color C2) of respective inks used to print the latent image region are registered for respective pixel values (RGB values). For example, when a pixel value of a pixel of interest in an input image is (R2, G2, B2), and this pixel of interest is that in the background region, the amounts of ink used (first color C1) of respective inks used to print this pixel of interest are c=20, m=0, y=6, and k=r=g=b=0. When this pixel of interest is that in the latent image region, the amounts of ink used (second color C2) of respective inks used to print this pixel of interest are c32 m=y=k=0, r=2, g=10, and b=5. A ratio of each color ink when a maximum amount of an ink applied per unit area on a printing medium is 100 for each RGB value is defined as "amount of ink used". Also, as described above, the first color C1 is that in the background region corresponding to each RGB value, and the second color C2 is that in the latent image region corresponding to each RGB value.

Also, in FIG. 10, unique indices are assigned to respective RGB values. That is, a color information number=Ci1 is assigned to (R1, G1, B1) as an index, and a color information number=Ci3 is assigned to (R3, G3, B3) as an index. Also, unique indices are assigned to sets of C1 and C2 corresponding to respective RGB values. For example, an ink combination number=2 is assigned, as an index, to a set of C1 and C2 (C1={c=20, m=0, y=6, k=r=g=b=0}, C2={c=m=y=k=0, r=2, g=10, b=5}) corresponding to (R2, G2, B2).

Note that in the following description, CIE L*a*b* is used as the color space. However, the gist of the technique to be described below is not limited to this color space. Even when other color spaces are adopted, the technique to be described below can be appropriately adapted for those who are skilled in the art.

An information generation apparatus 11 which configures a system according to this embodiment will be described below with reference to the block diagram shown in FIG. 1A. The information generation apparatus 11 generates the aforementioned color information. That is, the information generation apparatus 11 calculates amounts of ink used of respective inks required to print the background region, and those of respective inks required to print the latent image region for respective pixel values.

A pixel value input unit 101 acquires a pixel value group which is set in advance, for example, a pixel value group that can be used by a printer. An acquisition source is not particularly limited, and may be a memory (not shown) in the information generation apparatus 11 or an external apparatus. Then, the pixel value input unit 101 selects pixel values one by one from the acquired pixel value group, and outputs the selected pixel value to a subsequent color conversion processing unit 102 as a selected pixel value.

The color conversion processing unit 102 converts the pixel value (color component values) output from the pixel value input unit 101 into a pixel value (color component values) on a color space depending on a device (for example, a printer), and outputs the converted pixel value to a subsequent color information computing unit 105.

A threshold holding unit 103 holds a threshold (prescribed amount) Th1 of an amount of ink used of an ink having a high infrared ray absorption rate. A measurement data holding unit 104 holds color values (L*a*b* values) acquired by measuring colors of patterns printed using a plurality of colors of inks by amounts of ink used set for the respective inks, in association with the amounts of ink used. More specifically, the measurement data holding unit 104 holds a plurality of types of tables (color measurement tables) in which color values corresponding to various amounts of ink used are registered.

The color information computing unit 105 generates the color information shown in FIG. 10 using the pixel values obtained from the color conversion processing unit 102, the threshold Th1 obtained from the threshold holding unit 103, various color measurement tables held by the measurement data holding unit 104, and a list (to be described later) held by a list holding unit 106.

The list holding unit 106 holds a list in which ink candidates used to print the background region and those used to print the latent image region are registered. An ink data acquisition unit 107 acquires ink data indicating types of inks that can be used by an image processing apparatus 12 from the image processing apparatus 12. A color information output unit 113 outputs the color information generated by the color information computing unit 105 to the image processing apparatus 12.

Figure 2A:
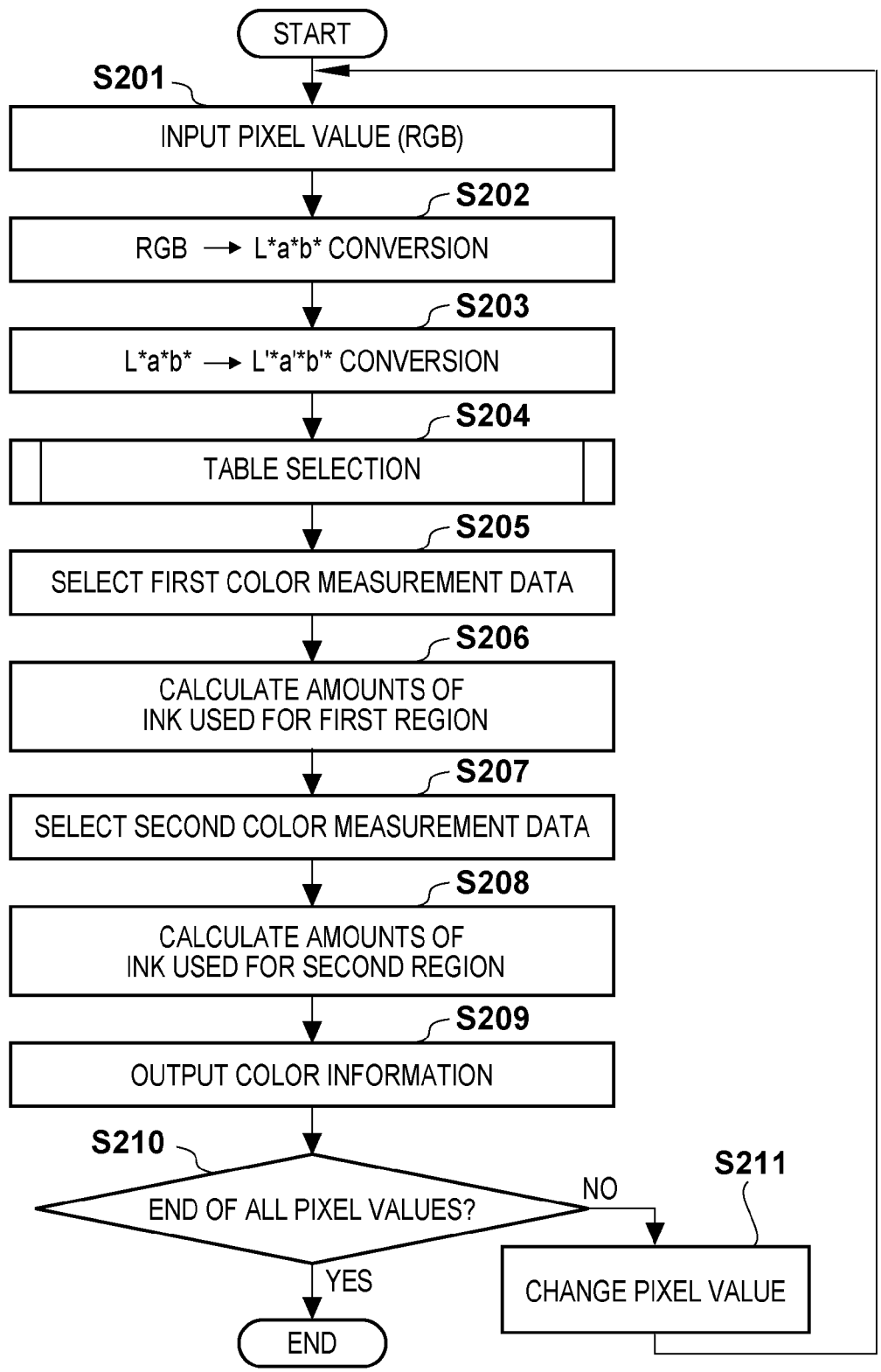
FIGS. 2A and 2B are flowcharts of processing to be executed by an information generation apparatus 11.
Figure 2B:
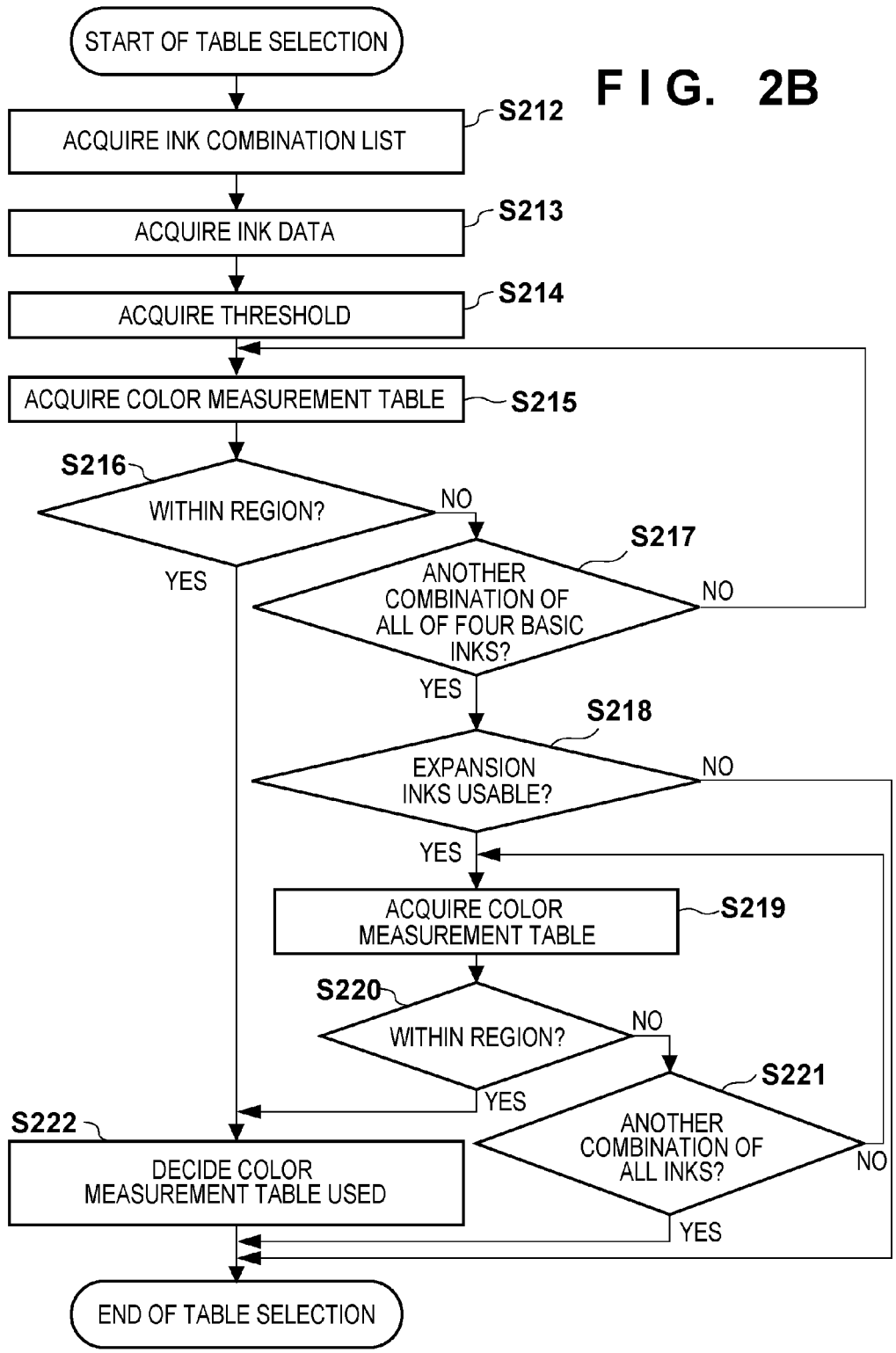

Processing to be executed by the information generation apparatus 11 having the aforementioned arrangement will be described below with reference to FIGS. 2A and 2B which show the flowcharts of that processing. In step S201, the pixel value input unit 101 selects one pixel value (R1, G1, B1) from a pixel value group, which is set in advance, as a selected pixel value. Then, the pixel value input unit 101 outputs this selected pixel value (R1, G1, B1) to the color conversion processing unit 102.

In step S202, the color conversion processing unit 102 converts the selected pixel value (R1, G1, B1) into a device-independent L*a*b* value. In step S203, the color conversion processing unit 102 converts the L*a*b* value into a device-dependent L'*a'*b'* value. This means that when the pixel value is converted into common color space data, and the common color space data is converted into color space data that can be expressed by a device, the color of the pixel value is converted into a color which can be output using inks to be used. Then, the color conversion processing unit 102 outputs the L'*a'*b'* value calculated by the above processing to the color information computing unit 105.

In step S204, the color information computing unit 105 selects a color measurement table for the first color C1 and that for the second color C2 from the color measurement table group held by the measurement data holding unit 104. Details of the processing in step S204 will be described below with reference to the flowchart shown in FIG. 2B. Of course, the color information computing unit 105 mainly executes the processes in respective steps in the flowchart shown in FIG. 2B.

In step S212, the color information computing unit 105 acquires a list in which candidates of a plurality of colors of inks used to print the first color C1 (a plurality of colors of inks used to print the background region) and those of a plurality of colors of inks used to print the second color C2 (a plurality of colors of inks used to print the latent image region) are registered. The acquisition source is not particularly limited, and may be either a memory (not shown) in the information generation apparatus 11 or an external apparatus. In this case, "the candidates of the plurality of colors of inks used to print the second color C2" include an ink having an infrared ray absorption rate higher than that of any one of "the candidates of the plurality of colors of inks used to print the first color C1".

However, in this embodiment, as "the candidates of the plurality of colors of inks used to print the first color C1" and "the candidates of the plurality of colors of inks used to print the second color C2", other configurations are available. For example, this embodiment is applicable to a case in which the candidates include the same type of ink having a high infrared ray absorption rate and have different amounts of ink used. In addition, this embodiment is applicable to a case in which inks of different types having high infrared ray absorption rates are included, and a case in which inks of two or more types having high infrared ray absorption rates are included and their amounts of ink used are different.

FIG. 17 shows a configuration example of the list used in this embodiment. In the list, a plurality of sets of "the candidates of the plurality of colors of inks used to print the first color C1" (first color candidates) and "the candidates of the plurality of colors of inks used to print the second color C2" (second color candidates) are registered, and numbers are assigned to these sets. For example, in case of the number=1, cyan (c), magenta (m), and yellow (y) are registered as the first color candidates, and cyan (c), magenta (m), yellow (y), and black (k) are registered as the second color candidates. Also, in case of the number=2, cyan (c), magenta (m), and yellow (y) are registered as the first color candidates, and red (r), blue (b), and green (g) are registered as the second color candidates. Furthermore, in case of the number=3, cyan (c), magenta (m), and yellow (y) are registered as the first color candidates, and cyan (c), magenta (m), yellow (y), and green (g) are registered as the second color candidates.

In the list shown in FIG. 17, the plurality of sets of first and second color candidates are registered, and the registration order of these sets is as follows. That is, as an overlapping region between the color gamuts of the first color candidates and the second color candidates which belong to the same set as the first color candidates is broader, this set is registered near the top of the list. Therefore, the overlapping region between the color gamuts of the respective color candidates in the set of the number=1 is broader than any of other sets. This is because it is more likely to express colors as L'*a'*b'* values as the overlapping region is broader. Therefore, determination in turn from the top of the list is to make determination in descending order of expression possibility of colors as L'*a'*b'* values, and is more efficient than random determination of ink combinations.

In the following description, a case will be taken as an example wherein a combination of inks having relatively low infrared ray absorption rates (cyan, magenta, and yellow) and an ink having a relatively high infrared ray absorption rate (black or green) is used as the second color candidates. Note that if there is an ink having a high infrared ray absorption rate in addition to black and green, that ink may be used in place of black and green.

In step S213, the ink data acquisition unit 107 receives ink data (Id) acquired from the image processing apparatus 12. This ink data indicates inks that can be used by the image processing apparatus 12, and indicates that only the four basic color inks can be used or that the three expansion color inks can be used in addition to the four basic color inks. This ink data can be different depending on a model of an apparatus used as the image processing apparatus 12. In the following description, ink data Id=0 indicates that only the four basic color inks can be used, and ink data Id=1 indicates that the three expansion color inks can be used in addition to the four basic color inks. However, the settings of values for Id are not limited to them.

In step S214, the color information computing unit 105 acquires a threshold for the amount of ink used of an ink having a high infrared ray absorption rate from the threshold holding unit 103. For example, when black and green are used as the inks having high infrared ray absorption rates, a threshold Th_k1 for black and threshold Th_g1 for green are acquired. These thresholds define minimum values of amounts of ink used of the inks having high infrared ray absorption rates, when an image can be recognized under infrared light.

In step S215, the color information computing unit 105 acquires a color measurement table for the first color C1 and that for the second color C2 from the measurement data holding unit 104 using the thresholds acquired from the threshold holding unit 103 and the list acquired from the list holding unit 106.

The measurement data holding unit 104 registers color measurement tables which associate the amounts of ink used of a plurality of colors of inks with $L^*a^*b^*$ values acquired by measuring colors of patterns printed using the plurality of colors of inks by amounts of ink used set for the respective inks, as shown in FIGS. 8A-8D. This association is registered for each combination of amounts of ink used which can be set for respective inks. Note that the colorimetry is done under ordinary light.

The color measurement tables are grouped for respective ink combinations. For example, to a group 81, a color measurement table 811 associated with a combination of inks c, m, and y (first ink group) belongs. In the color measurement table 811, the amounts of ink used of the inks c, m, and y, and $L^*a^*b^*$ values acquired by measuring colors of patterns printed using the inks c, m, and y by the respective amounts of ink used are registered for respective amounts of ink used (first holding).

Also, to a group 82, color measurement tables 821 to 823 associated with a combination of inks c, m, y, and k (second ink group) belong. In all of the color measurement tables 821 to 823, the amounts of ink used of the inks c, m, y, and k, and $L^*a^*b^*$ values acquired by measuring colors of patterns printed using the inks c, m, y, and k by the respective amounts of ink used are registered for respective amounts of ink used. Note that the color measurement table 821 is used when the amount of ink used of k is 1, the color measurement table 822 is used when the amount of ink used of k is 2, and the color measurement table 823 is used when the amount of ink used of k is 5.

To a group 83, color measurement tables 831 to 833 associated with a combination of inks r, g, and b belong. In all of the color measurement tables 831 to 833, the amounts of ink used of the inks r, g, and b, and $L^*a^*b^*$ values acquired by measuring colors of patterns printed using the inks r, g, and b by the respective amounts of ink used are registered for respective amounts of ink used. Note that the color measurement table 831 is used when the amount of ink used of g is 1, the color measurement table 832 is used when the amount of ink used of g is 2, and the color measurement table 833 is used when the amount of ink used of g is 10.

To a group 84, color measurement tables 841 to 843 associated with a combination of inks c, m, y, and g belong. In all of the color measurement tables 841 to 843, the amounts of ink used of the inks c, m, y, and g, and $L^*a^*b^*$ values acquired by measuring colors of patterns printed using the inks c, m, y, and g by the respective amounts of ink used are registered for respective amounts of ink used. Note that the color measurement table 841 is used when the amount of ink used of g is 1, the color measurement table 842 is used when the amount of ink used of g is 2, and the color measurement table 843 is used when the amount of ink used of g is 10.

Like the groups 82 to 84, when the combinations of inks include inks having high infrared ray absorption rates, different color measurement tables are held for respective amounts of ink used of the inks having high infrared ray absorption rates (second holding).

In step S215, the color information computing unit 105 refers to the list from the top. In case of the list shown in FIG. 17, the color information computing unit 105 refers to the set of the number=1 first. That is, the color information computing unit 105 refers to cyan (c), magenta (m), and yellow (y) as the first color candidates, and cyan (c), magenta (m), yellow (y), and black (k) as the second color candidates. Then, since cyan (c), magenta (m), and yellow (y) are referred to as the first color candidate, the color information computing unit 105 selects the color measurement table 811 corresponding to the combination of the referred inks in case of FIG. 8A. Also, since cyan (c), magenta (m), yellow (y), and black (k) are referred to as the second color candidates, the color information computing unit 105 selects the color measurement tables 821 to 823 corresponding to the combination of the referred inks in case of FIG. 8B. Note that when the acquired thresholds Th_k1 and Th_g1 are respectively Th_k1=5 and Th_g1=10, the color information computing unit 105 further selects a measurement table of k=5 of the acquired color measurement tables 821 to 823, that is, the color measurement table 823. Note that when red (r), blue (b), and green (g) are referred to as the second color candidates in this step, the color information computing unit 105 selects a color measurement table of g=10 of the color measurement tables 831 to 833, that is, the color measurement table 833.

The color information computing unit 105 judges in step S216 whether or not a position corresponding to the $L'^*a'^*b'^*$ value calculated in step S203 on the CIE $L^*a^*b^*$ color space is that located within an overlapping region between a color gamut occupied by an $L^*a^*b^*$ value group (color value group) registered in the color measurement table selected for the first color candidates, and that occupied by an $L^*a^*b^*$ value group registered in the color measurement table selected for the second color group. This "overlapping region" corresponds to, for example, the color gamut 502 in FIGS. 5E and 5F.

To restate, the process in step S216 judges whether or not the position corresponding to the $L'^*a'^*b'^*$ value calculated in step S203 on the CIE $L^*a^*b^*$ color space is that which is located within the color gamut occupied by the $L^*a^*b^*$ value group registered in the color measurement table selected for the first color candidates, and within the color gamut occupied by the L*a*b* value group registered in the color measurement table selected for the second color candidates.

Figure 16A:
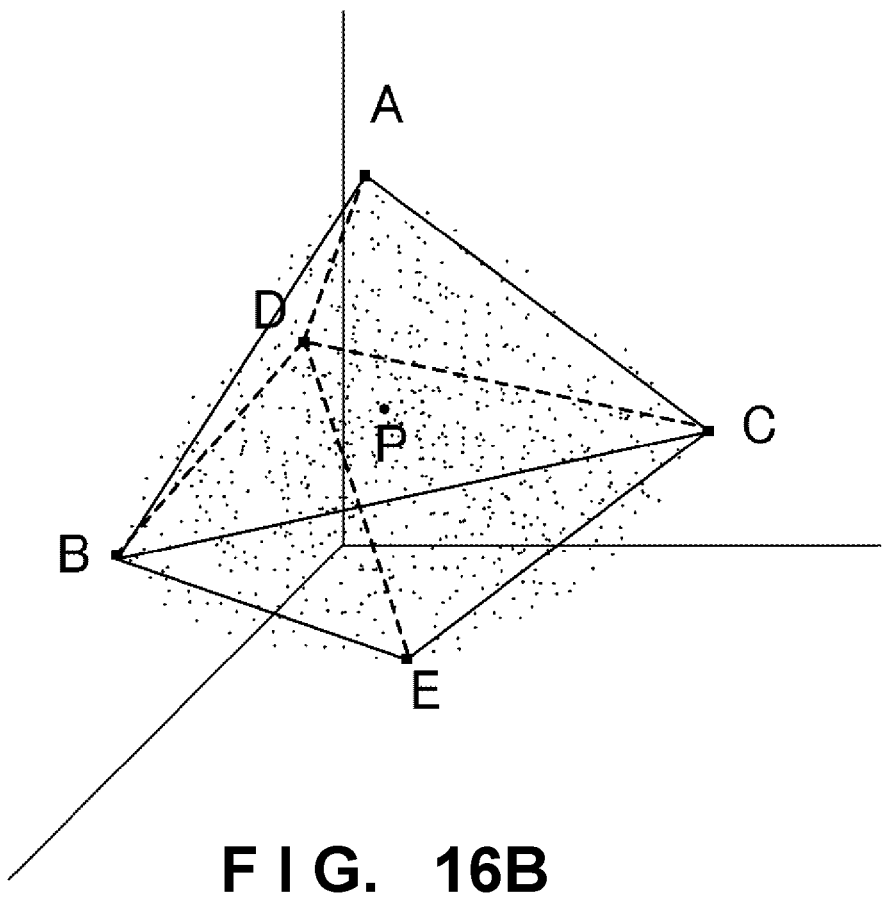
FIGS. 16A and 16B are views for explaining processing in step S216.
Figure 16B:
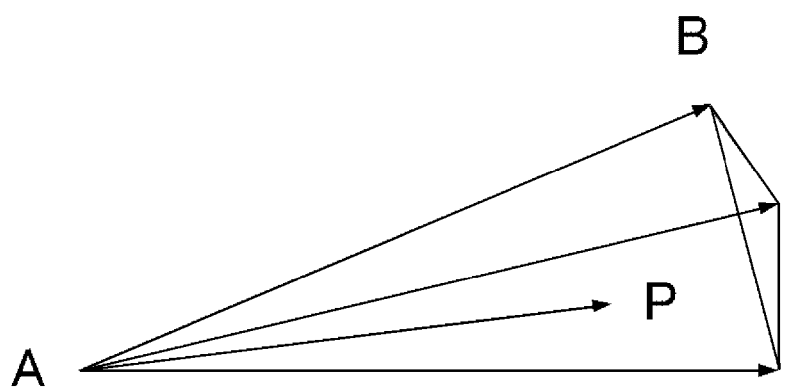

The process in step S216 will be described below with reference to FIGS. 16A and 16B. FIG. 16A shows a CIE L*a*b* color space defined by plotting the L*a*b* value group registered in the color measurement table selected for the first color candidates. In this case, the "color gamut occupied by the L*a*b* value group registered in the color measurement table selected for the first color candidates" can be approximated (included) by a hexahedron having points A, B, C, D, and E as vertices. Letting X(c, m, y) be the amounts of ink used of cyan, magenta, and yellow at a point X on the CIE L*a*b* color space, the respective points can be expressed by:

A(0, 0, 0), B(max, 0, 0), C(0, max, 0), D(0, 0, max),
E(max/3, max/3, max/3)

where max is a maximum amount of the amount of ink used per unit area.

Furthermore, this hexahedron can be expressed by two tetrahedrons ABCD and EBCD. That is, determination as to whether or not the L'*a'*b'* value falls within the color gamut occupied by the L*a*b* value group registered in the color measurement table selected for the first color group can be implemented by the following processing. That is, this processing executes interior/exterior determination of a tetrahedron for determining whether the L'*a'*b'* value is located inside or outside the tetrahedrons ABCD and EBCD. FIG. 16B is a view for explaining the interior/exterior determination of a tetrahedron. Letting A, B, C, and D be respective vertices of a tetrahedron, and P be a point to be determined, the relationship between the vertices and the point P can be expressed by:

$$\vec{AP} = s\vec{AB} + t\vec{AC} + u\vec{AD} \quad (1)$$

If the point P is located inside the tetrahedron ABCD, we have:

$$s+t+u \leq 1 \quad (2)$$

$$s \geq 0, t \geq 0, u \geq 0 \quad (3)$$

Hence, if inequalities (2) and (3) hold, it can be determined that the point P is located inside the tetrahedron ABCD; otherwise, it can be determined that the point P is located outside the tetrahedron ABCD. Therefore, using the aforementioned determination method, whether or not the position is located within the color gamut occupied by the L*a*b* value group registered in the color measurement table selected for the first color candidates is determined. Likewise, whether or not the position is located within the color gamut occupied by the L*a*b* value group registered in the color measurement table selected for the second color candidates is determined. In this way, the processing in this step can be implemented.

As a result of this determination, if the position is located within the region, the process advances to step S222 to decide the color measurement table selected for the first color candidates and that selected for the second color candidates in step S215 as the final selection results. On the other hand, if the position is located outside the region, the process advances to step S217.

The color information computing unit 105 determines in step S217 whether or not a set using the four basic color inks is registered after the set referred to in step S215. As a result of this determination, if a set using the four basic color inks is registered after the set referred to in step S215, the color information computing unit 105 selects this set, and executes the processes in step S215 and subsequent steps. On the other hand, if no set using the four basic color inks is registered after the set referred to in step S215, the process advances to step S218.

The color information computing unit 105 determines in step S218 with reference to the ink data Id acquired in step S213 whether or not this ink data indicates that the three expansion color inks can be used (whether or not Id=1). As a result of this determination, if the ink data indicates that the three expansion color inks can be used (if Id=1), the process advances to step S219; if the ink data indicates that the three expansion color inks cannot be used (if Id=0), this processing ends.

In step S219, the color information computing unit 105 refers to a first set (the set of the number=2 in FIG. 17) which uses the three expansion color inks after the set which is currently referred to in the list acquired in step S212. Then, the color information computing unit 105 executes the same process as in step S215 using this referred set, thereby selecting color measurement tables for the first and second color candidates, respectively. That is, in this case, the color information computing unit 105 selects the color measurement table 811 for the first color candidates, and a color measurement table of g=10, that is, the color measurement table 833 of the color measurement tables 831 to 833 for the second color candidates, since Th_g1=10.

In step S220, the color information computing unit 105 executes the same determination processing as in step S216 using the color measurement tables selected in step S219. As a result of this determination, if the position is located within the region, the process advances to step S222 to decide the color measurement table selected for the first color candidates and that selected for the second color candidates in step S219 as the final selection results. On the other hand, if the position is located outside the region, the process advances to step S221.

The color information computing unit 105 determines in step S221 whether or not a set using the three expansion color inks is registered after the set referred to in step S219. As a result of this determination, if the set using the three expansion color inks is registered after the set referred to in step S219, the color information computing unit 105 selects this set, and executes the processes in step S219 and subsequent steps. On the other hand, if no set using the three expansion color inks is registered after the set referred to in step S219, this processing ends.

By executing the aforementioned processing (that according to the flowchart shown in FIG. 2B), the color measurement table for the first color C1 and that for the second color C2 can be decided.

After that, the color information computing unit 105 calculates, using these two decided color measurement tables, the "amounts of ink used of respective inks used to print the first color C1" and "amounts of ink used of respective inks used to print the second color C2" for the L'*a'*b'* value obtained in step S203.

Referring back to FIG. 2A, in step S205, the color information computing unit 105 refers to (selects) the color measurement table for the first color C1 (first color measurement data). In step S206 (first calculation), the color information computing unit 105 specifies four L*a*b* values close to the L'*a'*b'* value obtained in step S203 of those registered in the color measurement table for the first color C1. This process is equivalent to that for specifying four L*a*b* values within a prescribed range from the position of the L'*a'*b'* value on the CIE L*a*b* color space of those registered in the color measurement table for the first color C1.

For example, assume that a combination of inks of the first color C1 includes cyan (c), magenta (m), and yellow (y). In this case, the color information computing unit 105 specifies four L*a*b* values spatially close to the L'*a'*b'* value from the color measurement table for the first color C1 (the color measurement table 811 in FIG. 8A).

Then, the color information computing unit 105 calculates an average L*a*b* value of these four L*a*b* values. The, the color information computing unit 105 calculates, by a known interpolation method, amounts of ink used corresponding to the calculated L*a*b* value, that is, amounts of ink used of respective inks when a pixel having the L'*a'*b'* value is printed using the first color C1. For example, assume that the calculated L*a*b* value is located between L*a*b* values X and Y registered in the color measurement table for the first color C1. In this case, the amounts of ink used corresponding to the calculated L*a*b* value are calculated by interpolation from those corresponding to the L*a*b* value X and those corresponding to the L*a*b* value Y.

The amounts of ink used when a pixel having the L'*a'*b'* value is printed using the first color C1 may be calculated by interpolation from those associated with the four L*a*b* values specified in the color measurement table for the first color C1.

Figure 9:
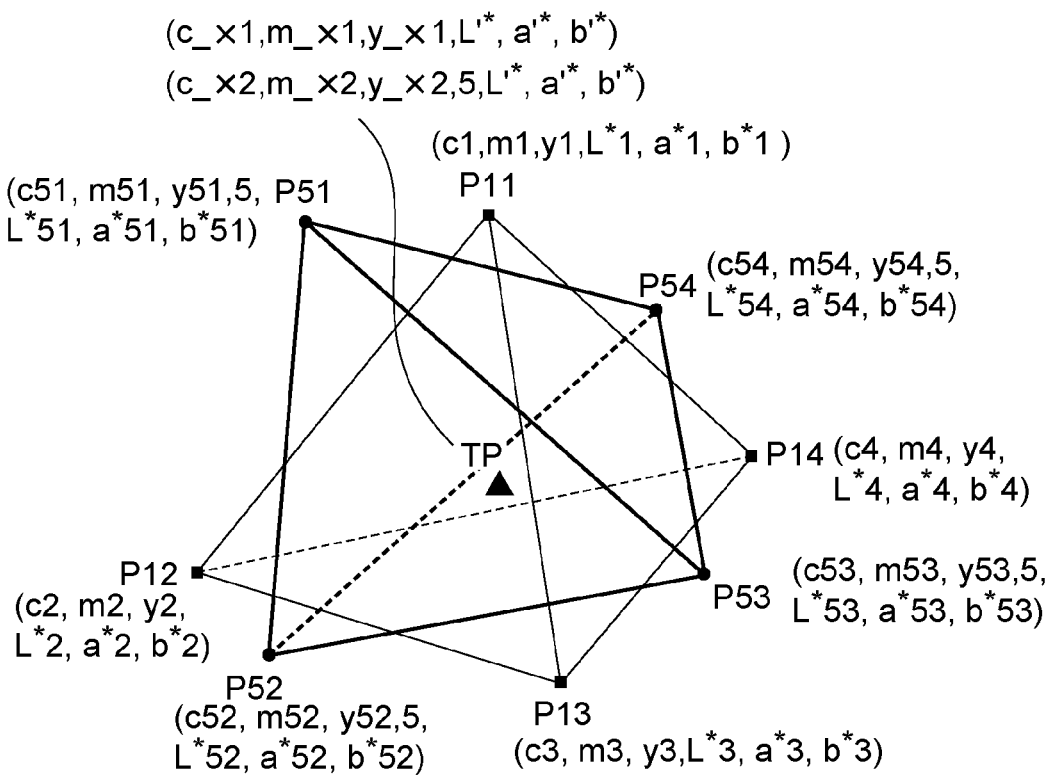
FIG. 9 is a view for explaining processing required to calculate amounts of ink used from four L*a*b* values.

Irrespective of the method to be adopted, the amounts of ink used to be calculated (those of c, m, and y) will be described as (c_x1, m_x1, y_x1) hereinafter. For example, assume that positions of the four L*a*b* values on the L*a*b* color space are positions P11, P12, P13, and P14, as shown in FIG. 9. In this case, amounts (c_x1, m_x1, y_x1) corresponding to a position Tp (L'*, a'*, b'*) are calculated by an interpolation method from these positions.

In step S207, the color information computing unit 105 refers to (selects) the color measurement table for the second color C2 (second color measurement data). Next, in step S208 (second calculation), the color information computing unit 105 specifies four L*a*b* values close to the L'*a'*b'* value obtained in step S203 of those registered in the color measurement table for the second color C2. This process is equivalent to that for specifying four L*a*b* values within a prescribed range from the position of the L'*a'*b'* value on the CIE L*a*b* color space of those registered in the color measurement table for the second color C2.

For example, assume that a combination of inks of the second color C2 includes cyan (c), magenta (m), yellow (y), and black (k), and the threshold Th_k1=5. In this case, the color information computing unit 105 specifies four L*a*b* values spatially close to the L'*a'*b'* value from the color measurement table for the second color C2 (the color measurement table 823 in FIG. 8B).

Then, the color information computing unit 105 calculates an average L*a*b* value of these four L*a*b* values. Then, the color information computing unit 105 calculates, by a known interpolation method, amounts of ink used corresponding to the calculated L*a*b* value, that is, amounts of ink used of respective inks when a pixel having the L'*a'*b'* value is printed using the second color C2. For example, assume that the calculated L*a*b* value is located between L*a*b* values X and Y registered in the color measurement table for the second color C2. In this case, the amounts of ink used corresponding to the calculated L*a*b* value are calculated by interpolation from those corresponding to the L*a*b* value X and those corresponding to the L*a*b* value Y.

The amounts of ink used when a pixel having the L'*a'*b'* value is printed using the second color C2 may be calculated by interpolation from those associated with the four L*a*b* values specified in the color measurement table for the second color C2.

Irrespective of the method to be adopted, the amounts of ink used to be calculated (those of c, m, and y) will be described as (c_x2, m_x2, y_x2) hereinafter. For example, assume that positions of the four L*a*b* values on the L*a*b* color space are positions P51, P52, P53, and P54, as shown in FIG. 9. In this case, amounts (c_x2, m_x2, y_x2) corresponding to a position Tp (L'*, a'*, b'*) are calculated by an interpolation method from these positions.

Then, in step S209, the color information computing unit 105 outputs the amounts of ink used calculated in step S206 and those calculated in step S208 in association with the selected pixel value (R1, G1, B1). An output destination is not particularly limited. In this embodiment, since the color information having the configuration shown in FIG. 10 is generated, a set of the amounts of ink used calculated in step S206, those calculated in step S208, and the selected pixel value (R1, G1, B1) is output to a memory accessible by the information generation apparatus 11. Note that indices for respective RGB values and those for the colors C1 and C2 are assigned to this set, as described above. Of course, one index may be assigned to one set, or data which can be used in place of the indices may be used instead if such data is available.

The color information computing unit 105 judges in step S210 whether or not all pixel values are selected from the "pixel value group which is set in advance". As a result of this judgment, if all pixel values are selected, the color information computing unit 105 configures the aforementioned color information from sets of [amounts of ink used calculated in step S206, those calculated in step S208, and selected pixel value (R1, G1, B1)] generated for the respective pixel values. The color information computing unit 105 then outputs the configured color information to the color information output unit 113, thus ending this processing. Note that upon reception of the color information, the color information output unit 113 transmits that information to the image processing apparatus 12 at an appropriate timing.

On the other hand, if pixel values to be selected still remain, the process advances to step S211. In step S211, the pixel value input unit 101 selects one of the pixel values to be selected as a selected pixel value. After that, the processes in step S201 and subsequent steps are executed for the selected pixel value.

The image processing apparatus 12 which configures the system according to this embodiment will be described below with reference to the block diagram shown in FIG. 1A. The image processing apparatus 12 prints respective pixels which form a print target image according to amounts of ink used indicated by the color information acquired from the information processing apparatus 11.

An image input unit 108 acquires a print target image. The acquisition method is not particularly limited. For example, information printed on a printing medium is scanned using a scanner to acquire a print target image. Alternatively, an image recorded in a memory may be acquired intact as a print target image. When print data such as PDL data is acquired, the PDL data may be expanded to form a print target image. Irrespective of a method to be adopted, the image input unit 108 may acquire a print target image by an arbitrary method as long as the print target image can be acquired.

A color information acquisition unit 114 acquires the color information transmitted from the information generation apparatus 11, and transfers the acquired color information to a color information holding unit 109. Thus, this color information is held in the color information holding unit 109. Of course, the color information generated on the side of the information generation apparatus 11 may be held in advance in a memory in the image processing apparatus 12.

An ink data holding unit 115 holds ink data indicating types of inks that can be used by the image processing apparatus 12. This ink data is as described above. A latent image generation unit 110 acquires or generates a latent image required to discriminate whether each pixel on the print target image is that of a latent image region or that of a background region.

A discrimination image data generation unit 111 discriminates using the latent image acquired from the latent image generation unit 110 whether each pixel which forms the print target image acquired from the image input unit 108 is that of the latent image region or that of the background region. Then, the discrimination image data generation unit 111 specifies amounts of ink used for each pixel using the color information held by the color information holding unit 109 depending on whether each pixel belongs to the background region or latent image region.

A discrimination image output unit 112 acquires a printing medium from the interior of the image processing apparatus 12 or a paper feeder connected to the image processing apparatus 12, prints the print target image on the acquired printing medium according to the specified amounts of ink used, and externally discharges the printing medium on which the print target image is printed.

Figure 11:
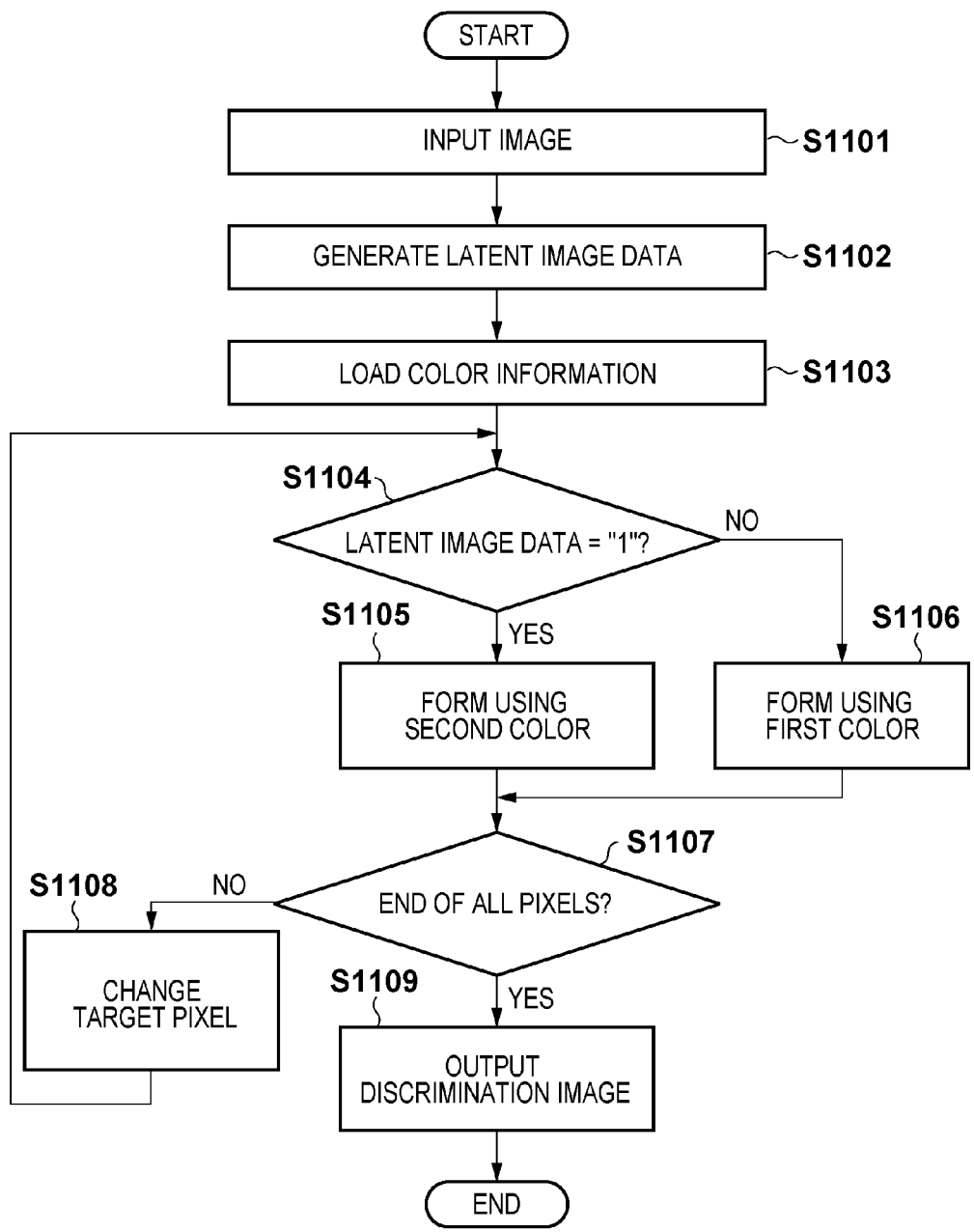
FIG. 11 is a flowchart of processing to be executed by an image processing apparatus 12.

Processing to be executed by the image processing apparatus 12 will be described below with reference to FIG. 11 which shows the flowchart of that processing. In step S1101, the image input unit 108 acquires a print target image I, and outputs the acquired print target image I to the discrimination image data generation unit 111. In this case, the print target image I is that which can be handled in pixel units. For example, when an image is a paper document, the image input unit 108 includes a charge coupled device CCD or optical sensor, and generates the print target image I by executing image capturing processing, electrical signal processing, digital signal processing, and the like in response to an image input instruction. Alternatively, when an image is data described in a page description language or data which is generated by an application that handles a specific data format, that data format is converted into a general image format (for example, a bitmap format) to acquire the print target image I. In this case, assume that the generated print target image I is configured by two pixel values (R1, G1, B1) and (R2, G2, B2), as shown in FIG. 13A, for the sake of simplicity.

In step S1102, the latent image generation unit 110 acquires latent image data C which represents a pattern or text to be visualized under infrared light, generates a latent image Ic from the acquired latent image data C, and outputs the generated latent image Ic to the discrimination image data generation unit 111.

The latent image Ic is binary image data which can be handled in pixel units, a pixel which configures a pattern or text portion has a pixel value "1", and a pixel which configures a region other than this portion has a pixel value "0". For example, assume that the latent image data C is data which represents an image that describes characters "Original", as shown in FIG. 13B. In this case, the latent image generation unit 110 generates, as the latent image Ic, a binary image generated by replacing pixel values of pixels, which configure characters in the image shown in FIG. 13B, by "1", and those of pixels, which do not configure any characters, by "0". Note that if the latent image data C is originally a binary image, that binary image may be used intact as the latent image Ic.

Assume that the vertical and horizontal sizes of the latent image Ic are the same as those of the print target image I. However, for example, if the vertical and horizontal sizes of the latent image Ic are smaller than those of the print target image I, the latent image Ic is enlarged, as shown in FIG. 14A. If the vertical and horizontal sizes of the latent image Ic are larger than those of the print target image I, the latent image Ic is reduced, as shown in FIG. 14B. Also, an image prepared by repetitively pasting the latent image Ic within a region of the size of the print target image I, as shown in FIG. 14C, may be used anew as the latent image Ic.

In step S1103, the discrimination image data generation unit 111 acquires the color information held in the color information holding unit 109. Then, the discrimination image data generation unit 111 acquires the amounts of ink used (for the first and second colors C1 and C2) respectively associated with the pixel values (R1, G1, B1) and (R2, G2, B2) from this color information.

In step S1104, the discrimination image data generation unit 111 refers to one pixel from the latent image Ic acquired from the latent image generation unit 110. Pixels can be referred to in a raster scan order from, for example, the upper left corner position of the latent image Ic. Hence, when this step is executed for the first time, the discrimination image data generation unit 111 refers to a pixel at the upper left corner position of the latent image Ic in this step. Then, the discrimination image data generation unit 111 judges whether or not a pixel value (a pixel value of interest) of the referred pixel (print target pixel) is "1". As a result of this judgment, if the pixel value is "1", the process advances to step S1105; if it is "0", the process advances to step S1106.

In step S1105, letting R be a position of the pixel referred to in step S1104, the discrimination image data generation unit 111 sets a pixel at the position R on the print target image I as that within the latent image region. Then, when the pixel value of the pixel at the position R on the print target image I is (R1, G1, B1), the discrimination image data generation unit 111 sets the amounts of ink used for the second color C2 of those acquired in step S1103 in association with (R1, G1, B1) as pixel information at the position R of a discrimination image. In an example of FIG. 10, pixel information (8, 26, 5, 5, 0, 0, 0) is set at the position R of the discrimination image. On the other hand, if the pixel value of the pixel at the position R on the print target image I is (R2, G2, B2), the discrimination image data generation unit 111 sets the amounts of ink used for the second color C2 of those acquired in step S1103 in association with (R2, G2, B2) as pixel information at the position R of a discrimination image. In the example of FIG. 10, pixel information (0, 0, 0, 0, 2, 10, 5) is set at the position R of the discrimination image.

In step S1106, letting R be a position of the pixel referred to in step S1104, the discrimination image data generation unit 111 sets a pixel at the position R on the print target image I as that within the background region. Then, if the pixel value of the pixel at the position R on the print target image I is (R1, G1, B1), the discrimination image data generation unit 111 sets the amounts of ink used for the first color C1 of those acquired in step S1103 in association with (R1, G1, B1) as pixel information at the position R of a discrimination image. In the example of FIG. 10, pixel information (10, 28, 8, 0, 0, 0, 0) is set at the position R of the discrimination image. On the other hand, if the pixel value of the pixel at the position R on the print target image I is (R2, G2, B2), the discrimination image data generation unit 111 sets the amounts of ink used for the first color C1 of those acquired in step S1103 in association with (R2, G2, B2) as pixel information at the position R of a discrimination image. In the example of FIG.

10, pixel information (20, 0, 6, 0, 0, 0, 0) is set at the position R of the discrimination image.

The discrimination image data generation unit 111 judges in step S1107 whether or not all pixels on the latent image Ic have been referred to (whether or not pieces of pixel information of pixels which configure the discrimination image have been decided). As a result of this judgment, if all the pixels have been referred to, the process advances to step S1109; if pixels to be referred to still remain, the process advances to step S1108.

In step S1108, the discrimination image data generation unit 111 sets a pixel to be referred to as a reference target pixel, and executes the processes in step S1104 and subsequent steps. With the above processes, pixel information indicating inks and their amounts is assigned to each of pixels of the discrimination image.

In step S1109, the discrimination image data generation unit 111 outputs data of the discrimination image, that is, pieces of pixel information of respective pixels which configure the discrimination image, to the discrimination image output unit 112. Then, the discrimination image output unit 112 prints the print target image I on a printing medium. In this case, respective pixels which configure the print target image I are printed according to the inks and amounts of ink used indicated by the pieces of pixel information of pixels at corresponding positions on the discrimination image.

The printed printing medium is visually recognized as a color images of two colors under ordinary light, as shown in FIG. 13C. When the printing medium is irradiated with infrared light, and is observed using an infrared camera, a latent image can be discriminated, as shown in FIG. 13D.

Note that in this embodiment, the information generation apparatus 11 and image processing apparatus 12 are configured as independent apparatuses. However, the present invention is not limited to this, and the image processing apparatus 12 may include the information generation apparatus 11. In this case, the image processing apparatus 12 generates color information by itself, and prints an image using the generated color information.

[Second Embodiment]

The first embodiment increases the number of printable colors by reducing an amount of ink used of an ink having a high infrared ray absorption rate within a range that allows a print image to be discriminated under infrared light, and adding other inks. However, when the amount of ink used of the ink having the high infrared ray absorption rate is reduced, since a lightness level under infrared light lowers, the print image is recognized as a pale image by a device such as an infrared camera. Therefore, when the amount of ink used of the ink having the high infrared ray absorption rate is reduced so as to increase the number of colors that can be used in printing, a print image is recognized as a pale image under infrared light. On the other hand, when the amount of ink used of the ink having the high infrared ray absorption rate is increased so as to allow the print image to be recognized as a clear image under infrared light, the number of colors that can be used in printing is reduced. Hence, the number of colors that can be used in printing and the amount of ink used of the ink having the infrared ray absorption rate have a tradeoff relationship.

Hence, some users may want to increase the number of colors since a printed image need only be recognized palely under infrared light, or some other users may want to recognize a clear image under infrared light although the number of colors can be reduced to some extent. Therefore, specifications that match such use cases are demanded.

Thus, this embodiment sets modes such as a "number of colors priority mode" which meets the demand for increasing the number of colors and a "lightness priority mode" which meets the demand for allowing to recognize a clear image under infrared light, and the user can select a desired mode. Hence, color information can be generated according to the selected mode.

An example of the functional arrangement of a system according to this embodiment will be described below with reference to the block diagram shown in FIG. 1B. Note that the same reference numerals in FIG. 1B denote the same components as those shown in FIG. 1A, and a description thereof will not be repeated.

A mode selection unit 1201 selects one of the "number of colors priority mode" required to increase the number of colors that can be used in printing and the "lightness priority mode" required to allow an image to be discriminated at a higher lightness level under infrared light. An information generation apparatus 11 may select the mode depending on the situation, and the mode may be selected according to an input instruction from the user.

A threshold holding unit 1202 holds a "threshold Th1 of an amount of ink used of an ink having a high infrared ray absorption rate" used when the "number of colors priority mode" is selected, and a "threshold Th2 of an amount of ink used of the ink having the high infrared ray absorption rate" used when the "lightness priority mode" is selected.

Figure 18:
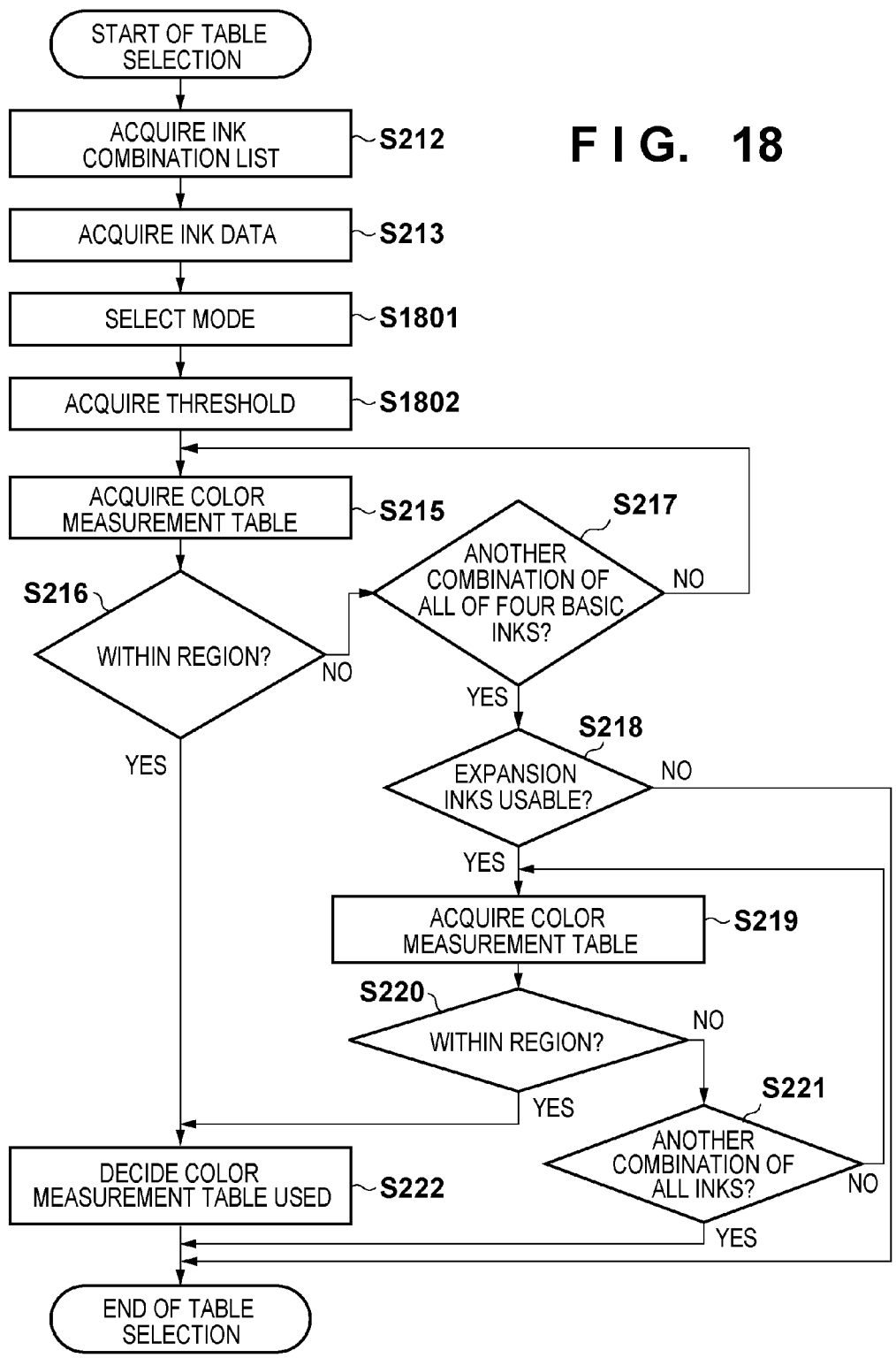
FIG. 18 is a flowchart of processing in step S204.

Processing to be executed by the information generation apparatus 11 according to this embodiment will be described below. The information generation apparatus 11 according to this embodiment basically executes the processing according to FIG. 2A, but the contents of the processing in step S204 (that for selecting a color measurement table for a first color C1 and that for a second color C2) are different from the first embodiment. In this embodiment, processing according to the flowchart shown in FIG. 18 is executed in step S204. Hence, the processing in step S204 to be executed in this embodiment will be described below with reference to FIG. 18. Note that the same step numbers in FIG. 18 denote the same steps as those shown in FIG. 2B, and a description thereof will not be repeated.

In step S1801, the mode selection unit 1201 selects one of the aforementioned two modes, and notifies a color information computing unit 105 of the selected mode. As the mode, when the user wants to increase the number of colors that can be used in printing although a print image has a low lightness level under infrared light, he or she selects the "number of colors priority mode". On the other hand, when the user wants to allow a print image to be discriminated at a high lightness level under infrared light although the number of colors that can be used in printing is reduced, he or she selects the "lightness priority mode".

In step S1802, the color information computing unit 105 acquires a threshold corresponding to the mode notified from the mode selection unit 1201 from the threshold holding unit 1202. For example, assume that a threshold Th_k1 for black and a threshold Th_g1 for green are held in the threshold holding unit 1202 as those corresponding to the "number of colors priority mode". Furthermore, assume that a threshold Th_k2 for black and a threshold Th_g2 for green are held in the threshold holding unit 1202 as those corresponding to the "lightness priority mode". In this case, when the mode selection unit 1201 selects the "number of colors priority mode", the color information computing unit 105 reads out the thresholds Th_k1 and Th_g1 from the threshold holding unit 1202. On the other hand, when the mode selection unit 1201 selects the "lightness priority mode", the color information computing unit 105 reads out the thresholds Th_k2 and Th_g2 from the threshold holding unit 1202.

In this case, since a lightness level is low under infrared light in the "number of colors priority mode", and it is high under infrared light in the "lightness priority mode", the following relations hold.

Th_k1<Th_k2

Th_g1<Th_g2

Also, as shown in FIG. 4, inks having higher infrared ray absorption rates have different lightness levels even when the amount of ink used remains the same. Hence, the values of the thresholds Th_k1 and Th_g1, and thresholds Th_k2 and Th_g2 are set to attain identical lightness levels.

As described above, according to this embodiment, color information according to the selected mode (that generated in the number of colors priority mode or that generated in the lightness priority mode) can be generated. Furthermore, when print processing is executed using the color information generated in this way, a print image according to the selected mode can be obtained.

Note that in this embodiment, the thresholds are decided in advance in correspondence with the respective modes, and the thresholds to be used are switched by switching the mode. Alternatively, the thresholds may be directly changed without selecting the mode.

[Third Embodiment]

In the second embodiment, when a mode is selected on the side of the information generation apparatus 11, color information according to the selected mode is generated, thus attaining print processing according to the selected mode. In the third embodiment, pieces of color information respectively corresponding to selectable modes are held in advance, and a mode is selected when a discrimination image is generated. Then, print processing is executed using the color information corresponding to the selected mode.

An example of the functional arrangement of a system according to this embodiment will be described below with reference to the block diagram shown in FIG. 1C. Note that the same reference numerals in FIG. 1C denote the same components as those shown in FIGS. 1A and 1B, and a description thereof will not be repeated.

A color information computing unit 1203 generates color information according to a mode selected by a mode selection unit 1201. Note that in this embodiment, color information used by an image processing apparatus 12 when a number of colors priority mode is set on the side of the image processing apparatus 12, and that used when a lightness priority mode is set on the side of the image processing apparatus 12 have to be generated. Hence, the mode selection unit 1201 selects one of the modes to activate the color information computing unit 1203, thereby generating color information corresponding to the selected mode. After that, the mode selection unit 1201 selects the other mode to activate the color information computing unit 1203, thereby generating color information corresponding to this selected mode. Then, the information generation apparatus 11 outputs the pieces of color information generated for the respective modes to the image processing apparatus 12 via a color information output unit 113. Hence, the pieces of color information corresponding to the respective modes are held in a color information holding unit 109 via a color information acquisition unit 114.

A mode selection unit 1204 selects one of the number of colors priority mode and lightness priority mode as in the mode selection unit 1201, and notifies a discrimination image data generation unit 111 of the selected mode. The discrimination image data generation unit 111 reads out and uses color information corresponding to the selected mode from the color information holding unit 109.

Figure 12:
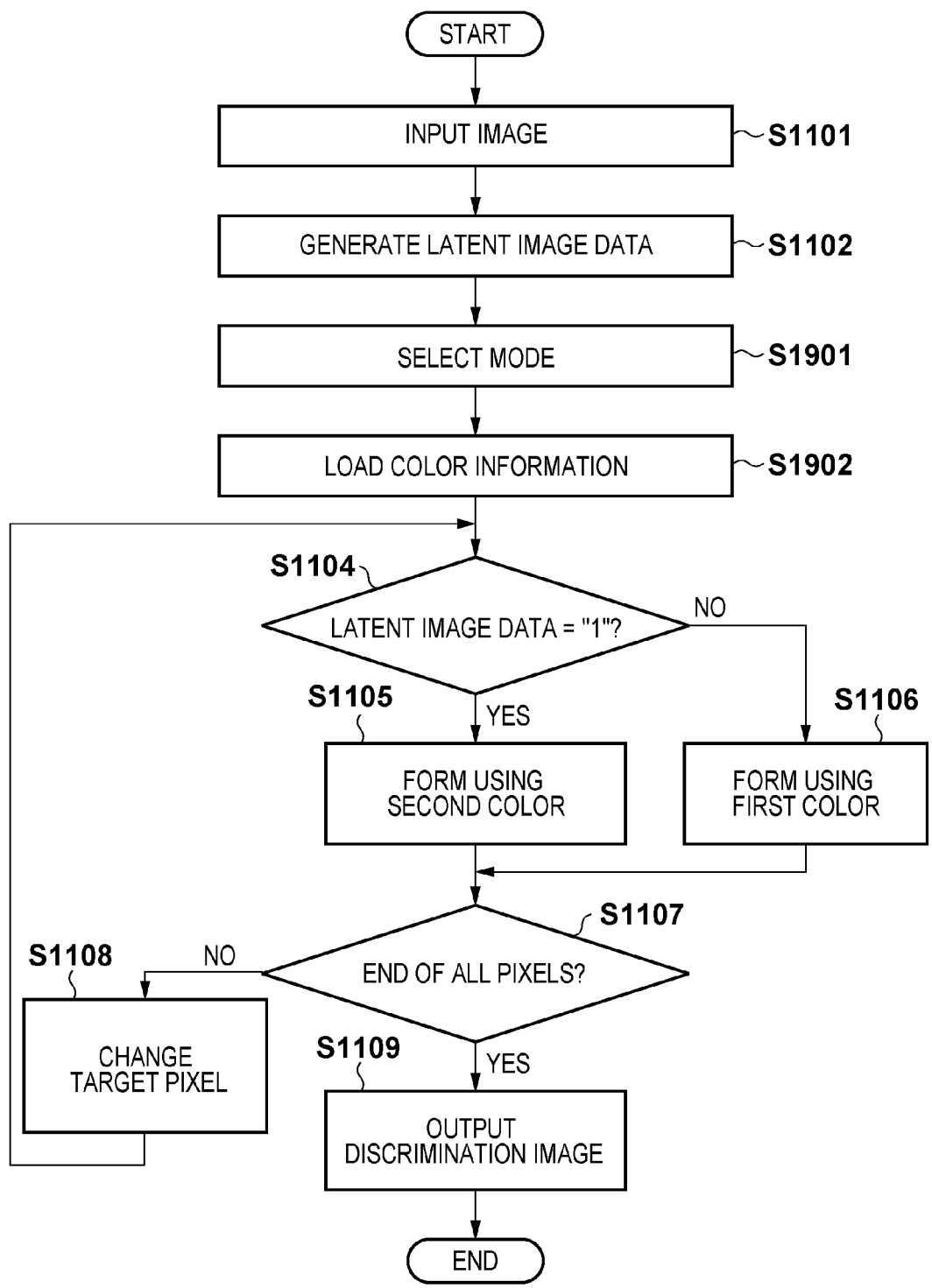
FIG. 12 is a flowchart of processing to be executed by the image processing apparatus 12.

Processing to be executed by the image processing apparatus 12 according to this embodiment will be described below with reference to FIG. 12 which shows the flowchart of that processing. Note that the same step numbers in FIG. 12 denote the same steps as those shown in FIG. 11, and a description thereof will not be repeated. Also, when the processing according to the flowchart shown in FIG. 12 is executed, the pieces of color information corresponding to the respective modes have already been held in the color information holding unit 109.

In step S1901, the mode selection unit 1204 selects one of the number of colors priority mode and lightness priority mode, and notifies the discrimination image data generation unit 111 of the selected mode.

In step S1902, the discrimination image data generation unit 111 acquires the color information corresponding to the mode selected in step S1901 of those which are held in the color information holding unit 109 and correspond to the respective modes.

After that, the same processing as in the first embodiment is executed. Then, a discrimination image can be generated using the color information according to the selected mode. Note that the pieces of color information corresponding to the respective modes need not always be generated in advance to be held in the color information holding unit 109. For example, upon reception of a print instruction, the image processing apparatus 12 may control the information generation apparatus 11 to generate color information. In this case, the information generation apparatus 11 and image processing apparatus 12 may be configured as independent apparatuses, or the image processing apparatus 12 may include the information generation apparatus 11.

Also, as described above, the user may select the mode or the mode may be selected according to an output mode on the side of the image processing apparatus 12. For example, when an image is to be output in a "photo mode" as print quality, since a large number of colors are used, the "number of colors priority mode" is selected; when an image is to be output in a "monochrome mode", the "lightness priority mode" is selected.

[Fourth Embodiment]

Figure 15:
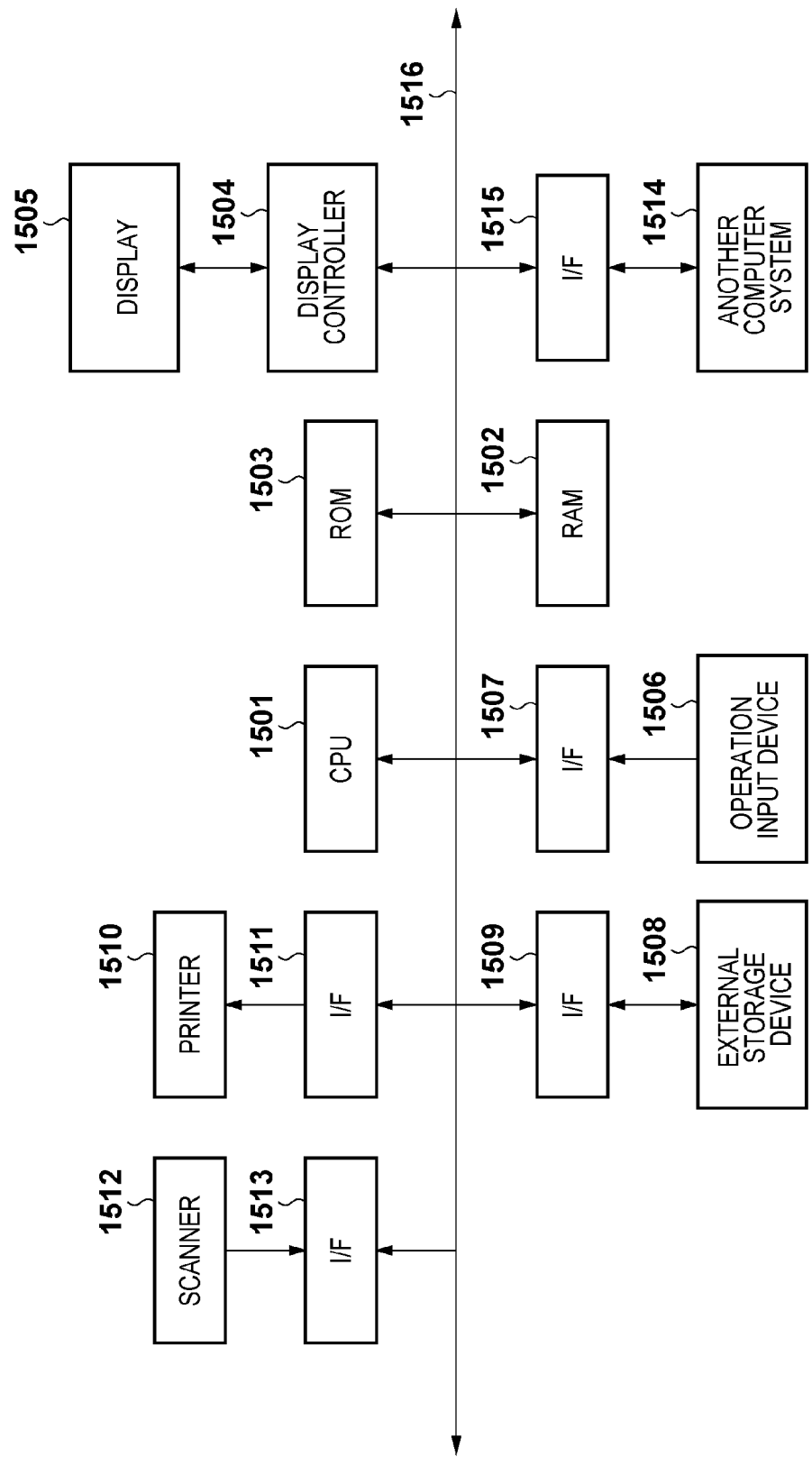
FIG. 15 is a block diagram showing an arrangement example of a computer.

Respective units which configure the information generation apparatus 11 shown in FIGS. 1A to 1C may be implemented by hardware. Alternatively, the threshold holding unit 103, measurement data holding unit 104, and list holding unit 106 may be implemented using a memory, and the remaining units may be implemented by software. In this case, to a computer which has this memory and executes this software, a computer having an arrangement shown in FIG. 15 is applicable.

A scanner 1512 scans information printed on a printing medium such as a paper sheet as an image. The scanned image is transferred to a RAM 1502 or external storage device 1508 via an I/F (interface) 1513 and is stored there.

A printer 1510 is used to print an image or characters on a printing medium based on data received via an I/F 1511, and includes, for example, an ink-jet printer, laser beam printer, thermal transfer printer, dot impact printer, or the like. This printer 1510 may be used as, for example, the aforementioned image processing apparatus 12.

A CPU 1501 controls the overall operations of this computer using computer programs and data stored in the RAM 1502 and a ROM 1503, and executes the aforementioned processes described above as those to be implemented by the information generation apparatus 11 to which this computer is applied.

The RAM 1502 has an area used to temporarily store computer programs and data loaded from the external storage device 1508, image data transferred from the scanner 1512, and data received from another computer system 1514 via an I/F 1515. Furthermore, the RAM 1502 has a work area used when the CPU 1501 executes various kinds of processing. That is, the RAM 1502 can provide various areas. The ROM 1503 stores setting data, a boot program, and the like of this computer. A display 1505 includes a CRT or liquid crystal panel, and displays images and characters under the control of a display controller 1504.

The external storage device 1508 serves as a large-capacity information storage device used to save various kinds of information. The external storage device 1508 saves an OS (Operating System), computer programs and data required to control the CPU 1501 to execute the processes described above as those to be implemented by the information generation apparatus 11, and various kinds of information described as given information. This given information includes table information shown in FIGS. 8A-8D and 17. The computer programs and data saved in the external storage device 1508 are loaded onto the RAM 1502 via an I/F 1509 under the control of the CPU 1501 as needed, and are to be processed by the CPU 1501.

An operation device 1506 includes input devices such as a keyboard and mouse, and various instructions input by operating the operation device 1506 by the user are sent to the CPU 1501 via an I/F 1507. These instructions include the aforementioned mode selection instruction.

Another computer system 1514 includes one or more computers connected to a network such as a LAN or the Internet, and this computer can exchange various kinds of information with that computer system 1514 via an I/F 1515.

The CPU 1501, I/Fs 1507, 1509, 1511, 1513, and 1515, RAM 1502, ROM 1503, and display controller 1504 are connected to a bus 1516.

Note that in this embodiment, processes except for the scan and print processes are implemented by the computer. Alternatively, using a dedicated hardware circuit included in the scanner or printer, the processes to be implemented by the computer may be executed instead.

Note that the arrangement shown in FIG. 15 is merely an example of the arrangement of the computer applicable to the information generation apparatus 11. New components may be added to the arrangement shown in FIG. 15 as needed, or appropriate components of the arrangement shown in FIG. 15 may be omitted depending on the situation. Some of processes to be executed by one component may be shared by other components. The same applies to the components shown in FIGS. 1A to 1C.

The aforementioned embodiments may be applied to a system including a plurality of devices (for example, a host computer, interface device, reader, and printer) or an apparatus consisting of a single device (for example, a copying machine, multi-function peripheral, or facsimile apparatus). The aforementioned embodiments may be combined as needed, and some technical items may be added or omitted when they are combined.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-259521, filed Nov. 19, 2010, which is hereby incorporated by reference herein in its entirety.

What is claimed is:

1. An information generation apparatus comprising:

a first holding unit that holds sets of color values acquired by measuring, in advance, colors of patterns printed using a first color material group including color materials of a plurality of colors by amounts of color material used, which are set for the respective color materials, and the amounts of color material used, which are set for the respective color materials of the first color material group, for respective combinations of the amounts of color material used, which are allowed to be set for the respective color materials of the first color material group;

a second holding unit that holds sets of color values acquired by measuring, in advance, colors of patterns printed using a second color material group including a color material having a higher infrared ray absorption rate than the plurality of color materials by amounts of color material used, which are set for the respective color materials, and the amounts of color material used, which are set for the respective color materials of the second color material group, for respective combinations of the amounts of color material used, which are allowed to be set for the respective color materials of the second color material group;

a unit that selects one pixel value from a pixel value group, which is set in advance, as a selected pixel value;

a first calculation unit that specifies color values, differences from a color value of the selected pixel value of which fall within a prescribed range, from a color value group held by said first holding unit on a color space, to which that color value group belongs, specifies amounts of color material used held by said first holding unit to be set with the specified color values, and calculates amounts of color material used of respective color materials, used when a pixel having the selected pixel value is to be printed using the first color material group, by interpolation from the specified amounts of color material used;

a second calculation unit that specifies color values, differences from a color value of the selected pixel value of which fall within a prescribed range, from a color value group held by said second holding unit on a color space, to which that color value group belongs, specifies amounts of color material used held by said second holding unit to be set with the specified color values, and calculates amounts of color material used of respective color materials, used when a pixel having the selected pixel value is to be printed using the second color material group, by interpolation from the specified amounts of color material used;

a unit that stores, in a memory, the amounts of color material used of the respective color materials of the first color material group calculated by said first calculation unit and the amounts of color material used of the respective color materials of the second color material group calculated by said second calculation unit in association with the selected pixel value; and an output unit that reads out from the memory the amounts of color material used of the respective color materials of the first color material group and the amounts of color material used of the respective color materials of the second color material group, which respectively correspond to pixel values of the pixel value group, which is set in advance, and outputs the readout amounts to a printing apparatus.

2. The apparatus according to claim 1, wherein the color value of the selected pixel value is a color value located inside a region which includes positions of respective color values held by said first holding unit on a color space to which the respective color values belong, and a color value located inside a region which includes positions of respective color values held by said second holding unit on the color space.

3. The apparatus according to claim 1, wherein said second calculation unit reads out color values held by said second holding unit for respective combinations in each of which an amount of color material used of the color material having the higher infrared ray absorption rate than the plurality of color material assumes a prescribed amount of the combinations of the amounts of color material used, which are allowed to be set for the respective color materials of the second color material group, and said second calculation unit specifies color values, differences from the color value of the selected pixel value of which fall within a prescribed range, from the readout color value group on the color space, to which that color value group belongs, specifies amounts of color material used held by said second holding unit to be set with the specified color values, and calculates amounts of color material used of respective color materials, used when the pixel having the selected pixel value is to be printed using the second color material group, by interpolation from the specified amounts of color material used.

4. The apparatus according to claim 3, further comprising a unit that changes the prescribed amount.

5. The apparatus according to claim 1, wherein when a print target pixel is a pixel which belongs to a background region, the printing apparatus prints the print target pixel using the first color material group by the amounts of color material used of the respective color materials of the first color material group, which correspond to a pixel value of the print target pixel, and when the print target pixel is a pixel which belongs to a latent image region, the printing apparatus prints the print target pixel using the second color material group by the amounts of color material used of the respective color materials of the second color material group, which correspond to a pixel value of the print target pixel.

6. An information generation method executed by an information generation apparatus, which comprises:

a first holding unit that holds sets of color values acquired by measuring, in advance, colors of patterns printed using a first color material group including color materials of a plurality of colors by amounts of color material used, which are set for the respective color materials, and the amounts of color material used, which are set for the respective color materials of the first color material group, for respective combinations of the amounts of color material used, which are allowed to be set for the respective color materials of the first color material group; and a second holding unit that holds sets of color values acquired by measuring, in advance, colors of patterns printed using a second color material group including a color material having a higher infrared ray absorption rate than the plurality of color materials by amounts of color material used, which are set for the respective color materials, and the amounts of color material used, which are set for the respective color materials of the second color material group, for respective combinations of the amounts of color material used, which are allowed to be set for the respective color materials of the second color material group, the method comprising:

a step of controlling a selection unit of the information processing apparatus to select one pixel value from a pixel value group, which is set in advance, as a selected pixel value;

a first calculation step of controlling a first calculation unit of the information generation apparatus to specify color values, differences from a color value of the selected pixel value of which fall within a prescribed range, from a color value group held by the first holding unit on a color space, to which that color value group belongs, to specify amounts of color material used held by the first holding unit to be set with the specified color values, and to calculate amounts of color material used of respective color materials, used when a pixel having the selected pixel value is to be printed using the first color material group, by interpolation from the specified amounts of color material used;

a second calculation step of controlling a second calculation unit of the information generation apparatus to specify color values, differences from a color value of the selected pixel value of which fall within a prescribed range, from a color value group held by the second holding unit on a color space, to which that color value group belongs, to specify amounts of color material used held by the second holding unit to be set with the specified color values, and to calculate amounts of color material used of respective color materials, used when a pixel having the selected pixel value is to be printed using the second color material group, by interpolation from the specified amounts of color material used;

a step of controlling a storage unit of the information generation apparatus to store, in a memory, the amounts of color material used of the respective color materials of the first color material group calculated in the first calculation step and the amounts of color material used of the respective color materials of the second color material group calculated in the second calculation step in association with the selected pixel value; and an output step of controlling an output unit of the information generation apparatus to read out from the memory the amounts of color material used of the respective color materials of the first color material group and the amounts of color material used of the respective color materials of the second color material group, which respectively correspond to pixel values of the pixel value group, which is set in advance, and to output the readout amounts to a printing apparatus.

7. A non-transitory computer-readable storage medium storing a computer program for controlling a computer to function as respective units of an information generation apparatus of claim 1.

8. An image processing apparatus comprising:

a first holding unit that holds, for respective pixel values which are set in advance, amounts of color material used of respective color materials used when a color of the pixel value is printed using a plurality of colors of color materials;

a second holding unit that holds, for the respective pixel values which are set in advance, amounts of color material used of respective color materials used when a color of the pixel value is printed using a plurality of colors of color materials including a color material having a higher infrared ray absorption rate than the plurality of color materials;

a unit that judges whether each pixel which configures a print target image belongs to a latent image region or a background region; and a unit that acquires, when a pixel of interest belongs to the latent image region, amounts of color material used of respective color materials corresponding to a pixel value of the pixel of interest from said second holding unit, and prints the pixel of interest on a printing medium according to the acquired amounts of color material used of the respective color materials, and acquires, when the pixel of interest belongs to the background region, amounts of color material used of respective color materials corresponding to a pixel value of the pixel of interest from said first holding unit, and prints the pixel of interest on the printing medium according to the acquired amounts of color material used of the respective color materials, wherein lightness of a pixel which is printed according to amounts of color material used of respective color materials held by said first holding unit in association with a pixel value of interest, and lightness of a pixel which is printed according to amounts of color material used of respective color materials held by said second holding unit in association with the pixel value of interest are hard to be visually recognized under ordinary light.

9. An image processing method executed by an image processing apparatus, which comprises:

a first holding unit that holds, for respective pixel values which are set in advance, amounts of color material used of respective color materials used when a color of the pixel value is printed using a plurality of colors of color materials; and a second holding unit that holds, for the respective pixel values which are set in advance, amounts of color material used of respective color materials used when a color of the pixel value is printed using a plurality of colors of color materials including a color material having a higher infrared ray absorption rate than the plurality of color materials, the method comprising:

a step of controlling a judging unit of the image processing apparatus to judge whether each pixel which configures a print target image belongs to a latent image region or a background region; and a step of controlling a print unit of the image processing apparatus to acquire, when a pixel of interest belongs to the latent image region, amounts of color material used of respective color materials corresponding to a pixel value of the pixel of interest from the second holding unit, and to print the pixel of interest on a printing medium according to the acquired amounts of color material used of the respective color materials, and to acquire, when the pixel of interest belongs to the background region, amounts of color material used of respective color materials corresponding to a pixel value of the pixel of interest from the first holding unit, and to print the pixel of interest on the printing medium according to the acquired amounts of color material used of the respective color materials, wherein lightness of a pixel which is printed according to amounts of color material used of respective color materials held by the first holding unit in association with a pixel value of interest, and lightness of a pixel which is printed according to amounts of color material used of respective color materials held by the second holding unit in association with the pixel value of interest are hard to be visually recognized under ordinary light.

* * * * *